(12) United States Patent
Zhi et al.

(10) Patent No.: US 11,094,929 B2
(45) Date of Patent: Aug. 17, 2021

(54) ENERGY STORAGE DEVICE, AN ELECTRODE FOR AN ENERGY STORAGE DEVICE, AND A METHOD OF FABRICATING THE ELECTRODE

(71) Applicant: City University of Hong Kong, Kowloon (HK)

(72) Inventors: Chunyi Zhi, New Territories (HK); Donghong Wang, New Territories (HK); Zijie Tang, Kowloon (HK); Guojin Liang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 177 days.

(21) Appl. No.: 16/403,963

(22) Filed: May 6, 2019

(65) Prior Publication Data
US 2020/0358089 A1 Nov. 12, 2020

(51) Int. Cl.
| H01M 4/36 | (2006.01) |
| H01M 4/62 | (2006.01) |
| H01M 4/50 | (2010.01) |
| H01M 10/0565 | (2010.01) |
| H01M 4/139 | (2010.01) |
| H01M 4/66 | (2006.01) |
| H01M 4/02 | (2006.01) |

(52) U.S. Cl.
CPC ......... *H01M 4/366* (2013.01); *H01M 4/139* (2013.01); *H01M 4/502* (2013.01); *H01M 4/62* (2013.01); *H01M 4/668* (2013.01); *H01M 10/0565* (2013.01); *H01M 2004/021* (2013.01); *H01M 2300/0085* (2013.01)

(58) Field of Classification Search
CPC ...... H01M 4/366; H01M 4/244; H01M 4/502; H01M 4/62; H01M 4/668
See application file for complete search history.

(56) References Cited

U.S. PATENT DOCUMENTS

| 2010/0203389 A1* | 8/2010 | Yoshida | C01B 25/45 429/224 |
| 2013/0164619 A1* | 6/2013 | Yamakaji | H01M 4/625 429/217 |
| 2015/0311503 A1* | 10/2015 | Ingale | H01M 4/50 320/130 |
| 2019/0280326 A1* | 9/2019 | Ceder | H01M 4/133 |
| 2019/0280327 A1* | 9/2019 | Sato | H01M 10/052 |

(Continued)

OTHER PUBLICATIONS

M. Song, et al, Recent Advances in Zn-Ion Batteries, Advanced Functional Materials, 2018, 28, 1802564.

(Continued)

*Primary Examiner* — Matthew J Merkling
(74) *Attorney, Agent, or Firm* — Renner Kenner Greive Bobak Taylor & Weber

(57) ABSTRACT

An electrode for an energy storage device and a method of fabricating such electrode. The electrode includes a plurality of layers of active material defining a layer material structure; and an interlayer material disposed between each adjacent pairs of layer of the active material. The interlayer material is arranged to facilitate a transportation of ions along and/or across the plurality of layers of active material during a charging or a discharging operation of the energy storage device.

20 Claims, 30 Drawing Sheets

(56) References Cited

U.S. PATENT DOCUMENTS

2020/0295360 A1* 9/2020 Bae ................... H01M 4/1393

OTHER PUBLICATIONS

H. Li et al, An extremely safe and wearable solid-state zinc ion battery based on a hierarchical structured polymer electrolyte, Energy & Environmental Science, 2018, 11, 941.

J. Liu, Addressing the Grand Challenges in Energy Storage, Materials Views, 2013, 23, 924.

B. Kang, et al, Battery materials for ultrafast charging and discharging, Nature, 2009, 458, 190.

Y. Tang, et al, Nanotubes: Mechanical Force-Driven Growth of Elongated Bending TiO 2-based Nanotubular Material for Ultrafast Rechargeable Lithium Ion Batteries, Advanced Materials, 2014, 26, 6111.

* cited by examiner

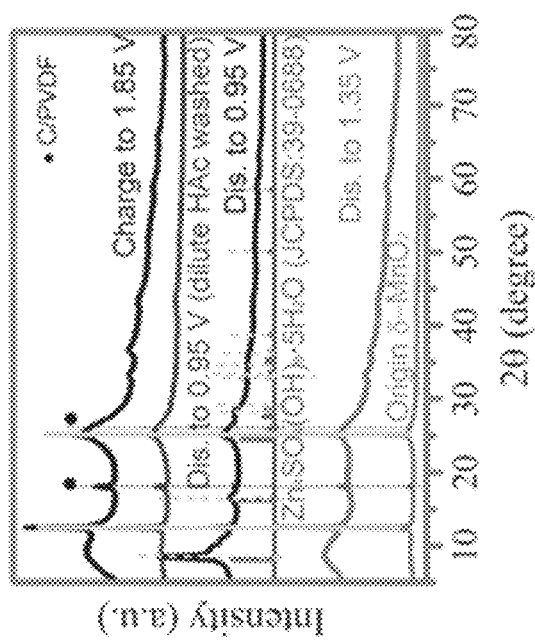
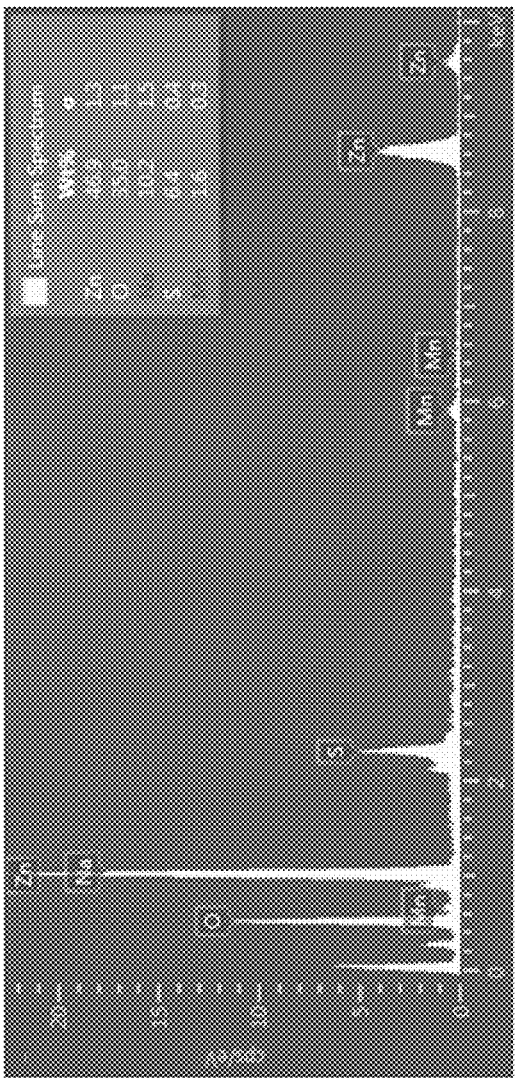
Fig. 14A
Fig. 14B
Fig. 14C

ENERGY STORAGE DEVICE, AN ELECTRODE FOR AN ENERGY STORAGE DEVICE, AND A METHOD OF FABRICATING THE ELECTRODE

TECHNICAL FIELD

The present invention relates to an electrode and a method of preparing the same, in particular, but not exclusively, to an electrode for a flexible battery.

BACKGROUND

Flexible and wearable devices are growing in use and are starting to become more mainstream. Flexible and wearable devices are being incorporated into wearable products that are also starting to become more popular and are starting to gain a wider usage.

A wearable energy source is a requirement for any wearable device. Wearable energy source devices have attracted tremendous attention due to the rapid development of wearable electronics. Examples of wearable power source may include supercapacitors or some particular batteries.

SUMMARY OF THE INVENTION

In accordance with the first aspect of the present invention, there is provided an electrode for an energy storage device, comprising: a plurality of layers of active material defining a layer material structure; and an interlayer material disposed between each adjacent pairs of layer of the active material; wherein the interlayer material is arranged to facilitate a transportation of ions along and/or across the plurality of layers of active material during a charging or a discharging operation of the energy storage device.

In an embodiment of the first aspect, the interlayer material includes at least one stabilizer intercalating between each of the adjacent pairs of layer of active material.

In an embodiment of the first aspect, the at least one stabilizer interacts with each of the adjacent pairs of layer of the active material so as to stabilize the layer material structure.

In an embodiment of the first aspect, the at least one stabilizer includes sodium ions and water molecules forming a physical interaction with each of the adjacent pairs of layer of the active material.

In an embodiment of the first aspect, the physical interaction includes van der Waals force that maintains integrity of the layer material structure during the charging or the discharging operation of the energy storage device.

In an embodiment of the first aspect, the layer material structure is further arranged to provide a plurality of interlayer channels for accommodating ions from an electrolyte, thereby minimizing a change in crystalline structure of each of the layers of active material upon performing an insertion and/or an extraction of the ions in the electrode that causes a change of volume in each of the layers of active material.

In an embodiment of the first aspect, the plurality of layers of active material includes a metal oxide.

In an embodiment of the first aspect, each of the layers of metal oxide includes a coordination compound of the metal oxide connecting with each other.

In an embodiment of the first aspect, each of the layers of $MnO_2$ includes $MnO_6$ octahedron units with edges connecting with each other.

In an embodiment of the first aspect, the electrode further includes a substrate, wherein the active material is disposed on the substrate.

In an embodiment of the first aspect, the substrate includes a layer of polymeric material arranged to maintain integrity of the electrode.

In an embodiment of the first aspect, the polymeric material is arranged to at least partially recombine a plurality of fragments of the electrode.

In an embodiment of the first aspect, the polymeric material includes a polymer matrix having a plurality of intermolecular hydrogen bonds arranged to reform when the fragments of the electrode contact with each other.

In an embodiment of the first aspect, the polymeric material includes carboxylated polyurethane.

In accordance with the second aspect of the present invention, there is provided an energy storage device, comprising: a first electrode; a second electrode in accordance with the first aspect of the present invention; and an electrolyte including an aqueous electrolytic solution disposed between the electrodes.

In an embodiment of the second aspect, the second electrode is a cathode including the plurality of layers of active material.

In an embodiment of the second aspect, the first electrode is an anode including zinc.

In an embodiment of the second aspect, the electrolyte includes a hydrogel electrolyte.

In an embodiment of the second aspect, the electrolyte is a hydrogel of polyacrylamide.

In an embodiment of the second aspect, the aqueous electrolytic solution includes $ZnSO_4$ and $MnSO_4$.

In an embodiment of the second aspect, the energy storage device is a rechargeable battery.

In accordance with the third aspect of the present invention, there is provided a method of fabricating an electrode comprising the steps of: providing a layer material structure defined by a plurality of layers of active material with an interlayer material disposed between each adjacent pairs of layer of the active material; and depositing the layer material structure on a substrate; wherein the interlayer material is arranged to facilitate a transportation of ions along and/or across the plurality of layers of active material during a charging or a discharging operation of the energy storage device.

In an embodiment of the third aspect, the step of providing a layer material includes the steps of: forming a precursor material of the active material by a hydrothermal reaction; and subjecting the precursor material to an oxidation reaction to obtain the active material.

In an embodiment of the third aspect, the step of forming a precursor material includes the step of forming the precursor material of $MnO_2$.

In an embodiment of the third aspect, the precursor material of $MnO_2$ includes $Mn(OH)_2$.

In an embodiment of the third aspect, the step of depositing the layer material structure includes the steps of:
  forming a slurry of the layer material structure; and
  depositing a layer of the slurry on the substrate.

In an embodiment of the third aspect, the method further includes the step of disposing a layer of polymeric material on the substrate.

In an embodiment of the third aspect, the polymeric material includes carboxylated polyurethane.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 14A is a plot showing the ex-situ XRD patterns of the NMOH electrode.

FIG. 14B is a SEM image of $Zn_4SO_4(OH)_6 \cdot 4H_2O$ after the NMOH electrode is discharged to 0.95 V.

FIG. 14C is an EDS spectra of the $Zn_4SO_4(OH)_6 \cdot 4H_2O$ of FIG. 14B. The insert indicates the corresponding weight ratio of the detected atom element.

DETAILED DESCRIPTION OF THE PREFERRED EMBODIMENTS

Figure 1A:
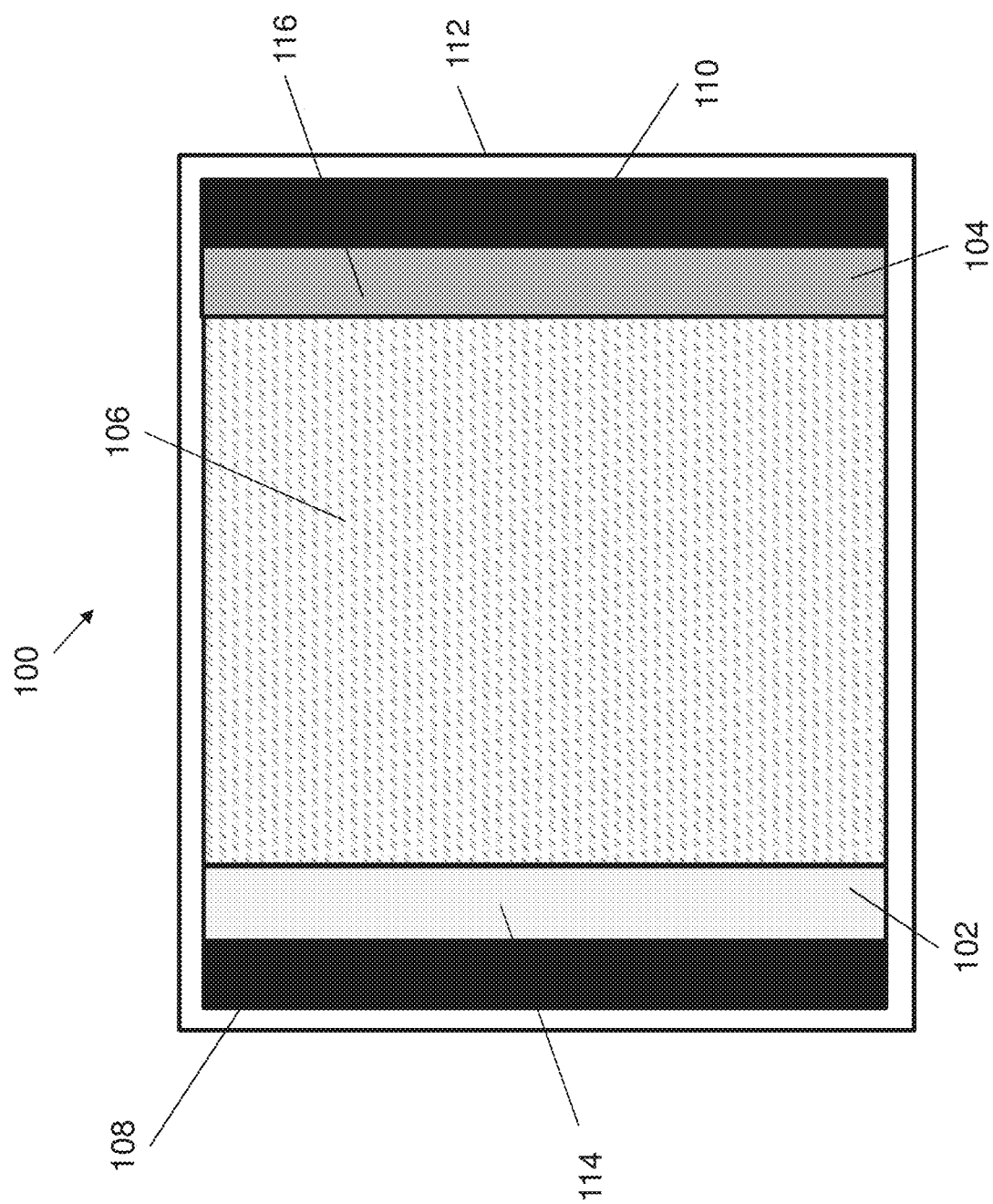
FIG. 1A illustrates of an energy storage device in accordance with an embodiment of the present invention.

The inventors have, through their own research, trials and experiments, devised that flexible electronics may be used in a variety of applications in healthcare, military, and other applications. For example, flexible electronics may be used in wearable electronic device components and devices (i.e. wearable electronics), which may include smart fabric materials in the wearable electronics. Preferably, devices including garments made with smart fabrics may be used in a variety of applications such as healthcare to replace bulky instruments and bulky electronic components.

One example of an energy storage device for flexible/wearable electronics is zinc-ion battery (ZIB) which may include advantages such as having much less toxic and flammable materials therein as compared with lithium-ion batteries, therefore may have much less safety and/or health concern to users. ZIB may also be low cost for scaling up as a result of the water-free and/or oxygen-free environment for assembling the battery. In addition, ZIB may have a high specific capacity as a result of multiple electron transfer and a low redox potential of $Zn^{2+}/Zn$.

It is appreciated that the conversion between chemical energy and electrical energy at a high discharge and charge rate may be required for multifunctional electronic devices and electric vehicles. For example, an urgent charging of vehicle on road may require the process to be completed in a matter of minutes instead of hours. In other words, a significantly high charging rate (e.g. greater than 10 C) may be needed to achieve such demanding requirement.

The inventors have, through their own research, trials, and experiments, devised that many batteries may either being very durable but having a low charging rate or being capable of performing a fast charging but not durable enough to sustain such fast charging process. Thus, it may be preferable to provide an energy storage device with a high charging rate as well as significantly high discharge/charge cycle stability.

In addition, it is appreciated that human bodies and organs are soft, curved, and constantly moving, flexible and wearable devices will therefore experience various mechanical forces during routine use, including forces from, for example, stretching, folding, hitting, shearing etc. The device sometimes may even experience accidently cutting and/or scratching during use. In other words, it is inevitable for the device to experience damages during routine usage or long term usage. Thus, it may also be preferable to provide an energy storage device with a self-healing property while the high charging rate and cycling stability of the device are maintained after repeated healing processes.

In accordance with an example embodiment of the present invention, there is provided an energy storage device with a high-speed charge/discharge rate. The device may be capable of charge and discharge at a rate of for example 20 C in 1 min while the cycling performance of the device is maintained. The device may also be capable of self-healing when fragments of the device contact with each other after being cut into pieces. In particular, the device may include an electrode that is arranged to facilitate a transportation of ions during a charging or a discharging operation of the device, and to "heal" or recombine the fragments of the device.

With reference to FIG. 1A, there is shown an exemplary embodiment of an energy storage device 100. The energy storage device 100 may be of any form that can capture energy produced at one time for use at a later time. In this example, the energy storage device is a battery, in particular a rechargeable battery. The battery 100 may be of any suitable form that fits a particular application, such as flat-shaped, fiber-shaped, twisted fiber-shaped, coin-shaped, ball-shaped etc. Regardless of the shape of the battery, the battery may be substantially arranged to be operable with a high charging and discharging rate and may be "self-healable" when the broken battery fragments are brought into contact with each other.

In this embodiment, the battery 100 comprises a first electrode 102 and a second electrode 104 being spaced apart from each other and an electrolyte 106 disposed between the first electrode 102 and the second electrode 104. An electrolyte 106 is sandwiched between and is electrically coupled with the first electrode 102 and the second electrode 104.

Optionally or additionally, the battery 100 may also include substrates 108, 110 which may provide mechanical supports to the anode and/or the cathode electrodes 102, 104. The substrates may also operate as a current collector to associate with the first electrode 102 and the second electrode 104 respectively. For example, the substrates may be electrically conductive and may be bonded to external electrical wires to deliver electrical energy to external electronic devices. In one example, the substrate may be further arranged to maintain integrity of the electrode and/or the battery. For example, the substrate may include a layer of material such as a layer of polymeric material that is capable of at least partially recombining a plurality of fragments of the electrode and/or the battery.

The battery 100 may optionally include an encapsulation 112 that receives and encases the first electrode 102, second electrode 104 and the electrolyte 106. The encapsulation 112 may be formed in any suitable shape such as for example a cylinder or a planar shape or any other suitable shape. The encapsulation 112 may be formed from a suitable material such as epoxy or a polymer.

In one example embodiment, the first electrode 102 functions as an anode and the second electrode 104 functions as a cathode of the battery 100. In operation there is a charge transfer between the anode 102 and the cathode 104 in order to convert chemical energy to electrical energy. The anode 102 and the cathode 104 are preferably being flexible. The anode 102 and cathode 104 are arranged in a suitable arrangement dependent on the desired shape of the battery 100.

With reference to FIG. 1A, the first electrode 102 (i.e. anode) comprises a substrate 108 with a metal or metal compound 114 disposed on the substrate 108. The substrate 108 may be of any suitable material. In one example the substrate 108 is a carbon cloth. Alternatively the substrate 108 may be selected from carbon nanotube (CNT) paper, carbon paper, nickel/copper alloy cloth or steel sheet. The substrate 108 may have some electrical conductance but is preferably robust enough to function within an electrolyte.

The anode 102 preferably comprises zinc. In one example, the anode may be a zinc sheet, particularly zinc nanosheet 114 that is electrodeposited onto carbon cloth 108. The carbon cloth 108 provides a base layer for the zinc to be deposited onto. The carbon cloth 108 may also have a rough surface with interwined structures which in turn facilitating the deposition of materials thereon. The zinc is deposited to form a substantially thick layer of zinc 114. The thickness may depend on the operational life of the battery 100.

In one example, the electrodeposited zinc may be highly crystalline and uniformly cover the entire surface of the carbon cloth. In particular, the electrodeposited zinc may have a highly porous architecture comprising interconnected nanoflakes. This may be advantageous as the nanocrystalline and porous structure may reduce ion diffusion path which in turn facilitating electrolyte penetration as well as charge/ion transport.

Alternatively the anode 102 may comprise a ribbon or a sheet of zinc metal. That is, the anode 102 may not include an additional substrate 108 and may include a piece of zinc metal. The zinc metal may be a flexible ribbon or a flexible sheet of zinc metal. The zinc metal is arranged in a suitable configuration based on the desired shape of the battery 100, or the anode may comprises zinc being deposited or electroplated on other types of substrates such as metal sheet include nickel and or copper.

The second electrode 104 (i.e. cathode) comprises a substrate 110 with an active material 116 disposed on the substrate. In one example, the substrate 110 may be in similar construction to the anode substrate 108. That is, the substrate 110 comprises a carbon cloth. Alternatively the substrate may be a CNT paper, carbon paper, nickel/copper alloy cloth or steel sheet.

The active material 116 comprises a metal oxide or a metal oxide compound. Preferably the active material 116 comprises $MnO_2$. The active material 116 (i.e. $MnO_2$) may have a layered material structure defined by a plurality layers of $MnO_2$ overlaying with each other. The layered material structure may also include an interlayer material disposed between each adjacent pairs of the $MnO_2$ layer. The interlayer material may interacts with the $MnO_2$ layer and therefore advantageously it may stabilize the layered material structure and may facilitate ion transportation during a charging or discharging operation of the battery. Detailed structural arrangement of the active material will be discussed in the later part of this disclosure.

The electrolyte 106 may be an aqueous electrolytic solution being disposed/contained the encapsulation 112 and the first electrode 102 (i.e. the anode) and the second electrode (i.e. the cathode) are positioned within the electrolyte. In one example, the aqueous electrolytic solution may include $ZnSO_4$ and $MnSO_4$. A skilled person may recognize any other electrolytic solutions including suitable salts or acids according to their needs. Alternatively, the electrolyte 106 may be a polymeric electrolyte disposed between the first electrode 102 and the second electrode 104. The polymeric electrolyte 106 may be a hydrogel electrolyte such as a hydrogel of polyacrylamide (PAM) containing an aqueous electrolytic solution and it is viscous enough to be formed into a shape and retain the shape it is formed into. For example, the electrolyte 106 may be formed into any one of an elongated shape, a planar shape, a tubular shape, a ball shape or any suitable shape. The electrolyte 106 is also capable of being retained within the battery 100 by being sandwiched between the electrodes 102 and 104. In other words, the electrodes 102 and 104 are disposed on opposite sides of the electrolyte 106.

In one example, the electrolyte 106 is flexible and may dissipate at least some mechanical energy when subjected to an external mechanical load applied to the battery 100, thereby allowing the battery 100 to maintain its electrochemical performance while under deformation. For example, the battery 100 may physical deform into different irregular shapes under the conditions of bending, folding, squeezing, twisting, cutting, and hammering while dissipating energy therefrom, and maintaining the electrochemical performance. In other words, the electrolyte may be capable of withstanding a certain amount of mechanical forces applied thereonto while the integrity of the electrolyte and thereby the battery is maintained.

Figure 1B:
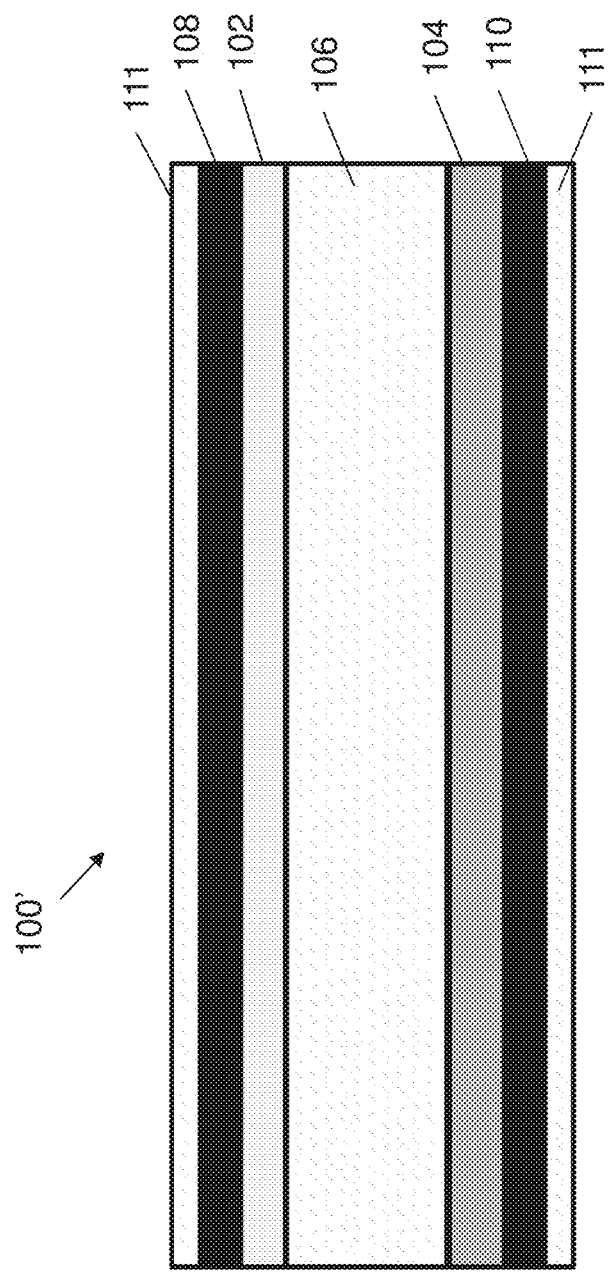
FIG. 1B illustrates a further configuration of the energy storage device of FIG. 1A.

With reference to FIG. 1B, there is provided a further configuration of battery 100 (i.e. battery 100'). The battery 100' may have a similar configuration to the battery 100 in view of electrodes and electrolyte. The battery 100' may have a first electrode 102 acting as an anode and a second electrode 104 acting as a cathode being spaced apart from each other. Each of the electrodes 102, 104 may also include a substrates 108, 110 supporting the electrodes. The electrolyte 106 is sandwiched between the electrodes 102, 104.

The substrates 108, 110 may further include at least one layer of polymeric material disposed on the substrates 108, 110. The at least one layer of polymeric material may be at least partially covered the outer surfaces of the electrodes 102, 104. In this example, each of the substrates 108, 110 includes a layer of polymeric material 111 being disposed on the outer surface (i.e. rear side) of each of the electrodes. In other words, the polymeric material layers are arranged to be opposite to the electrolyte 106, sandwiching the anode 102 and the cathode 104, respectively. Optionally or additionally, the polymeric material layers may be further arranged to disposed on the left and the right hand sides of the battery 100', connecting with the polymeric material layers on the substrates 108, 110, forming an encapsulation surrounding the battery 100'.

The polymeric material layer 111 may maintain the integrity of the electrodes and/or the battery. The polymeric material may be the one including a polymer matrix having a crosslinked structure constructed by a plurality of polymer chains connected by a plurality of intermolecular hydrogen bonds. The intermolecular hydrogen bonds may be reversibly broken and reform when the polymeric material is broken into fragments or when the fragments contact with each other, respectively. As such, any fragments that include the polymeric material layer may be partially or preferably fully recombined together when the fragments are brought into contact with each other.

For example, considering the electrodes 102, 104 including the polymeric material layer 111, when the electrodes are subjected to ways of cutting, hammering, smashing, etc., the intermolecular hydrogen bonds within the polymeric material will be broken; thereby the polymeric material along with the electrode will be broken into a plurality of fragments. Nevertheless, when the fragments are brought into contact with each other such as by bringing the cutting/broken edge of the fragments into contact with each other, the intermolecular hydrogen bonds at the contacting surface of the fragments will be reformed. This may also eventually restore the crosslinked structure of the polymeric matrix of the polymeric material and therefore recombining the fragments back together.

The polymeric material layer 111 may be made of any suitable materials. The polymeric material may be electrically conductive and may possess at least some degree of flexibility and mechanical resistance. In one example, the polymeric material may include polyurethane (PU). In another example, the polymeric material may include carboxylated PU.

The use the aforementioned polymeric material in the electrode and/or battery may be advantageous since it is unavoidable for the electrode and/or battery to experience damages during routine usage or long-term usage. Such healing property of the polymeric material may therefore provide a simple and convenient option to increase the durability of the electrode and/or battery. In addition, the electrochemical performance of the electrode and/or the battery may be maintained while having been subjected to several healing cycles. These advantages will be further illustrated in the examples discussed in the later part of this disclosure.

Figure 2:
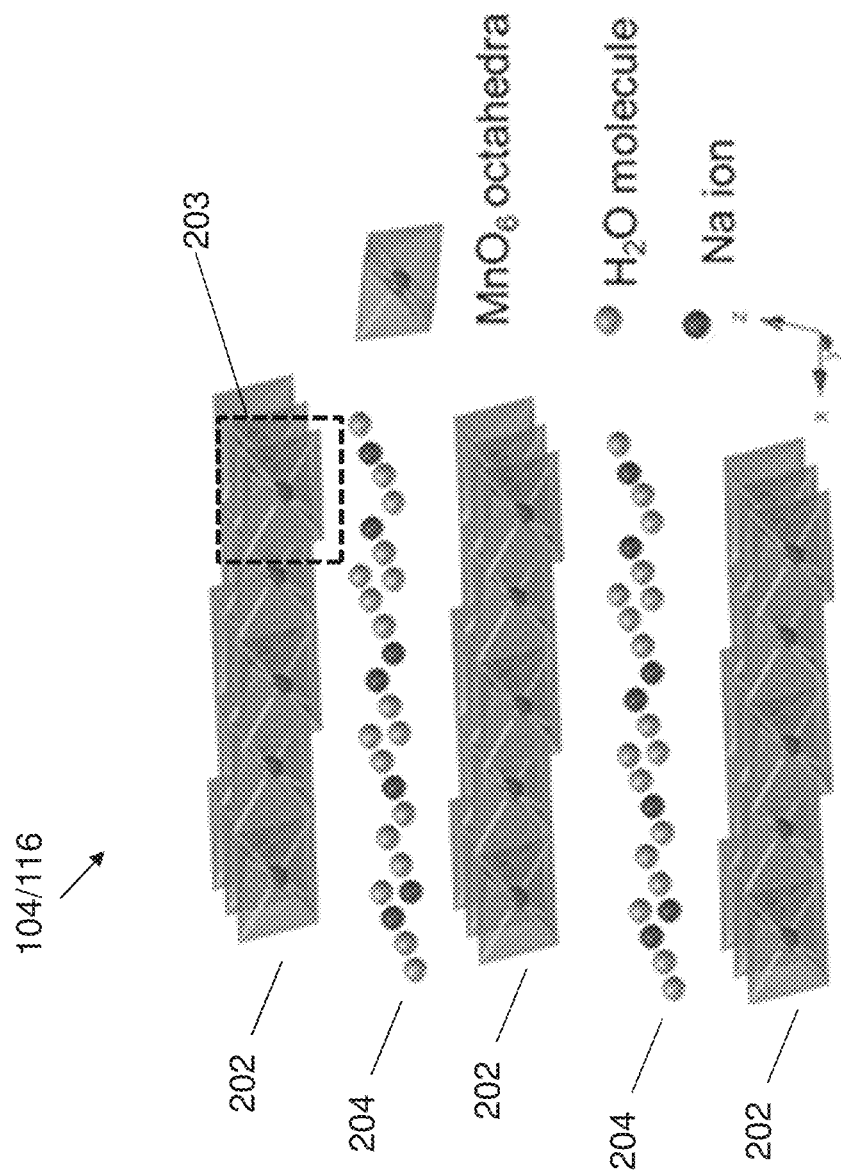
FIG. 2 illustrates the layered material structure of an electrode of the energy storage devices of FIGS. 1A and 1B.

With reference to FIG. 2, the electrode 104 (i.e. the cathode 104) comprises an active material 116 which may include a layer material structure. The active material may be structured or arranged into a plurality of layers, therefore the ions/active components in the battery interacts with the active material in each of these individual layers in the layer material structure during a charging or discharging operation of the battery.

The layer material structure may also include an interlayer material disposed between each adjacent pairs of layer of the active material. The interlayer material may interacts with the each adjacent pairs of layer of the active material so as to facilitate a transportation of ions along and/or across the plurality of layers of active material during a charging or a discharging operation of the battery 100 or 100'.

Referring to FIG. 2, the layered material structure include a plurality of layers of active material 202 with an interlayer material 204 disposed between each adjacent pairs of active material layer 202. The active material layers may include a metal oxide forming a plurality of coordination compounds 203 intimately connecting with each other. In this example, each of the metal oxide coordination compounds 203 include a metal centre bonded with six oxygen ligands (i.e. oxo ligands), forming an octahedral complex (an octahedron unit). Each of the octahedral complexes is bonded with each other by sharing the oxo ligands at the edge of the complexes. That is, the octahedral complexes are bonded together by connecting the edges with each other, forming each layer of the layer material structure of the active material.

Each of the metal oxide layers 202 is separated by the interlayer material 204. Preferably, the interlayer material includes at least one stabilizer such as sodium ions and water molecules intercalating between each of the adjacent pairs of layer of active material 202. The at least one stabilizer may form a physical interaction with each of the adjacent pairs of layer of the active material such as van der Waals forces that maintains integrity of the layer material structure during the charging or the discharging operation of the battery 100/100'.

In one example, the layer material structure may provide a plurality of interlayer channels for accommodating ions from the electrolyte during the charging or the discharging process. The layer material structure may be stabilized by the at least one stabilizer thereby minimizing a change in crystalline structure of each of the layers of active material upon performing an insertion and/or an extraction of the ions in the electrode that causes a change of volume in each of the layers of active material.

For example, during the charging and discharging processes, ions from the electrolyte may be repeatedly inserted into and extracted from the layer material structure. As such, each of the layers of active material of the layer material structure may repeatedly experience a volume change such as expansion and shrinking upon performing the ion insertion and extraction due to the adhesion and release of metal solid to and from the vacant sites in the active material layer.

Alternatively, different ions may include different radii and therefore they may have different rates of intake and/or release, which may further render the layer material structure experiencing at least a two-stage insertion and/or extraction of the ions. Thus, each of the layers of active material of the layer material structure may also experience a sudden volume change from shrinking to expansion or vice versa during the charging and discharging processes.

The intercalated sodium ions and water molecules may form a physical interaction such as van der Waals forces with the adjacent pairs of layer of active material so as to accommodate themselves within the interlayer of the layer material structure as well as stabilizing the whole layered structure during the charging or the discharging process. The sodium ions and the water molecules may prevent the layer material structure from collapsing or transforming into a structure that is less efficient for ion transportation/diffusion due to the repeated and/or sudden change of structure upon charging and/or discharging. In other words, the sodium ions and the water molecules may minimize a crystalline structural change of the layer material structure upon electrolyte ion insertion and/or extraction, thereby the layer material structure may provide large interlayer channels for ion intake and/or release during the charging and/or discharging processes. A skilled person may also recognize other suitable ion and/or molecule combination according to their needs.

Referring to FIG. 2, there is shown an example illustrating the layered structure of the active material 116 of the electrode 104. As mentioned above, the electrode 104 comprises a plurality of layers of active material defining a layer material structure; and an interlayer material disposed between each adjacent pairs of layers of the active material. The interlayer material may include at least one stabilizer being intercalated by each of the adjacent pairs of layers of the active material. In this example, the layer material structure is defined by a plurality of $MnO_2$ layers and each of the adjacent pairs of the $MnO_2$ layers are intercalating a plurality of sodium ions and water molecules.

Each $MnO_2$ layer is defined by its coordination compounds $MnO_6$, forming octahedron units interconnecting with each other. As shown in FIG. 2, the $MnO_6$ octahedron units connect with each other by sharing the oxo ligands at the edge of the units. That is, the $MnO_6$ octahedron units are bonded to each other edge by edge to form each $MnO_2$ layer.

The sodium ions and the water molecules are accommodated/intercalating between each adjacent pairs of the $MnO_2$ layers. The sodium ions and the water molecules act as stabilizers by forming van der Waals force with the $MnO_2$ layers such that the ion transportation/diffusion along and/or across the $MnO_2$ layers is facilitated during the charging and the discharging process. For example, considering a zinc-ion battery, hydrogen and zinc ions from the electrolyte may be repeatedly inserted into and released from the $MnO_2$ layer material structure during the charging and discharging processes. The $MnO_2$ layer material structure may repeatedly experience a volume change via shrinking and expansion of the $MnO_2$ layers in response to the ion intake and release.

In addition, provided that radii of the hydrogen ion are much smaller than the zinc ion, the hydrogen ions may be inserted into the layered $MnO_2$ structure prior to the zinc ions do. Thus, the $MnO_2$ layer material structure may also experience a two-stage ion insertion and/or extraction process. As such, the $MnO_2$ layer material structure may first shrink in response to the hydrogen ion insertion, followed by a sharp layer expansion in response to the zinc ion insertion.

As mentioned, the interactions formed between the $MnO_2$ layers with the intercalated sodium ions and the water molecules may prevent the structure from collapsing or transforming into a structure that is less efficient for ion transportation/diffusion due to the repeated and/or sudden volume change of structure upon charging and/or discharging. Thus, the sodium ions and the water molecules stabilize the layer material structure such that the layer material structure may expand and shrink with a minimal crystalline structure change, thereby providing large interlayer channels for ion intake and/or release during the charging and/or discharging processes.

It is appreciated that one of the requirements for a high-rate charging/discharging would be a fast kinetic of ion insertion and/or extraction. In other words, the electrode particularly the cathode would inevitably experience the aforementioned repeated and sudden change of structure upon the charging and/or discharging processes. Thus, an electrode or an electrode material of the present disclosure may be particularly advantageous as it is capable of providing ion diffusion facilitation as well as maintaining the stability and durability thereof.

The energy storage device of the present disclosure such as the battery 100/100' may be fabricated by commencing at the step of fabricating the electrodes. It may be first forming or providing a first electrode. In one example, the first electrode may be an anode formed by a zinc sheet. In another example, the first electrode may be an anode formed by electrodepositing zinc metal onto a substrate. Preferably, the substrate is a carbon cloth. Alternatively the substrate may be selected from carbon nanotube (CNT) paper, carbon paper, nickel/copper alloy cloth or steel sheet. The electrodeposition time may depend on the thickness requirement, which may depend on the operational life of the battery.

In this example, the anode is prepared by a facile electrochemical deposition method on the Ni/Cu alloy metal substrate. A two-electrode setup was used for Zn electroplating, in which the Ni/Cu alloy metal sheet may be used as a working electrode, while zinc plate was used as both counter and reference electrodes. An aqueous solution containing 1 mol·L$^{-1}$ of ZnSO$_4$ as used as the electrolyte. The electroplating was performed at 10 mA cm$^2$ for 3600 s using an electrochemical workstation (CHI 760D). The effective mass loading of zinc is about 3.0-5.0 mg cm$^{-2}$.

A second electrode may be fabricated after obtaining the first electrode (i.e. anode). In one example, the second electrode is a cathode. The fabrication of the cathode may comprise the steps of providing a layer material structure defined by a plurality of layers of active material with an interlayer material disposed between each adjacent pairs of layer of the active material; and depositing the layer material structure on a substrate; wherein the interlayer material is arranged to facilitate a transportation of ions along and/or across the plurality of layers of active material during a charging or a discharging operation of the energy storage device.

Preferably, the provision of the layer material structure includes the steps of forming a precursor material of the active material by a hydrothermal reaction; and subjecting the precursor material to an oxidation reaction to obtain the active material. In one example, the active material may be MnO$_2$, particularly MnO$_2$ nanoplate. The precursor of MnO$_2$ such as Mn(OH)$_2$ may be prepared by a hydrothermal reaction operated at 140-180° C. for 10-15 h. The as-prepared precursor may then be subjected to an oxidation reaction using an oxidizing agent such as NaClO to form a layered MnO$_2$ structure. At this stage, a layered MnO$_2$ structure with an interlayer of sodium ions and water molecule shall be obtained.

The as-obtained layer material structure may then be further process to form a slurry. The slurry may be formed by dissolving the layer material structure in a solvent with a conductive material and a binder under a predetermined weight ratio. In one example, the solvent, the conductive material, and the binder may be N-methyl-2-pyrrolidone (NMP), acetylene blacks, and PVDF, respectively. After that, the as-obtained slurry may be uniformly deposited on a substrate such as carbon cloth using a blade.

Additionally, a polymeric material that is arranged to maintain the integrity of the second electrode may be disposed on the substrate. The polymeric material may be obtained by curing a solution of the polymeric material at a predetermined temperature in a mold. In one example, the polymeric material may be a carboxylated polyurethane.

It is appreciated that the steps of forming the first and the second electrodes may be reversed (i.e. forming the second electrode prior to forming the first electrode) or may be performed simultaneously.

In this example, the second electrode is a cathode comprising a layered MnO$_2$ structure with an interlayer material of sodium ions and water molecules. The precursor material Mn(OH)$_2$ hexagonal nanoplates were prepared by dissolving 4 mmol of Mn(Ac)$_2$.4 H$_2$O in 40 mL of deionized water, follwed by adding 3 mL of hydrazine hydrate (N$_2$H$_4$.H$_2$O, 50%) slowly to the Mn(Ac)$_2$ solution under a stirring condition for 5 min. The mixture was poured into and sealed in a Teflon-lined stainless steel autoclave of 100 mL capacity. The autoclave was heated to and maintained at 180° C. for 12 h and then air-cooled to room temperature. The white product was collected by filtration, washed with distilled water and ethanol for a predetermined times.

The the as-prepared Mn(OH)$_2$ nanoplate precursor (0.2 g) was dispersed in 50 mL of deionized water, added with 10 mL of NaClO solution (active chlorine>10%) under stirring, forming an instant black suspension. After the suspension was stirred for 24 h at room temperature, the suspension was filtered, washed with deionized water and dried under vacuum at 60° C. for several hours to obtain the layered MnO$_2$ nanoplates intercalating sodium ions and water molecules.

The as-obtained layered MnO$_2$ nanoplates were then mixed with acetylene blacks and PVDF binder in a weight ratio of 7:2:1 with N-methyl-2-pyrrolidone (NMP). The mixture was stirred for 3 h and coated with a blade on a piece of carbon cloth paper. Finally, the whole structure was dried at 40° C. in a vacuum. The effective mass loading of MnO$_2$ is about 2.0-3.0 mg cm$^{-2}$. At this stage, a cathode of the layered MnO$_2$ containing an interlayer material of sodium ions and water molecules is obtained.

A free-standing PU sheet may be coated on the surface of the cathode. The PU sheet was prepared by drying a PU solution in a mould at room temperature under ambient conditions.

The electrolyte, particularly the hydrogel electrolyte of the energy storage device may be prepared by forming a mixture of a gel monomer, an initiator and a crosslinking agent. The mixture is optionally subjected to a degas process to remove any air bubbles therein, facilitating the subsequent curing process. The mixture may be cured at room temperature or at an elevated temperature in a mold. The cured hydrogel is soaked into an aqueous electrolytic solution to promote ion conductivity of the electrolyte.

In this example, the hydrogel electrolyte is polyacrylamide (PAM). The gel monomer is an acrylamide monomer, the initiator is potassium persulphate, and the crosslinking agent is N,N'-methylenebisacrylamide (MBAA). The mixture was formed by adding 30 mg of K$_2$S$_2$O$_8$ and 2 mg of MBAA to 20 ml of deionized water dissolved with 3 g of acrylamide monomer. The mixture was stirred for 30 mins. The mixture was then transferred into a mold with designed thickness and heated at 60° C. for 2~3 h to allow polymerization. The as-prepared hydrogel may be peeled off and optionally dried under room temperature or an elevated temperature. Finally, the as-prepared polymer film was soaked in an aqueous solution containing 2 mol L$^{-1}$ of ZnSO$_4$ and 0.2 mol L$^{-1}$ of MnSO$_4$ for 8-24 h to achieve an equilibrated state.

The battery 100/100' may be assembled in an open air environment. In one example, the battery may be a coin cell. The cell may be assembled by disposing the aforementioned anode (e.g. Zn anode) and cathode (e.g. MnO$_2$ cathode) within an aqueous electrolytic solution (e.g. 2 M ZnSO$_4$ and 0.2 M MnSO$_4$), using a non-woven filer paper as a separator.

In another example, the battery may be a flexible battery. The battery may be assembled by sandwiching a hydrogel electrolyte (e.g. PAM) with the aforementioned anode and cathode. A polymeric material (e.g. PU) may be further disposed on the rear sides (i.e. the outer surfaces) of the anode and the cathode, obtaining a "self-healable" battery.

The characterization and performance of embodiments of the electrode and the energy storage device containing the electrode will now be discussed. Structural and phase characterizations of the as-prepared electrodes were performed by XRD using a Bruker D2 Phaser diffractometer with Cu Kα irradiation (λ=1.54 Å. The surface morphology of these samples was characterized by an environmental scanning electron microscope (ESEM, FEI/Philips XL30). The morphology and microstructure of the samples were revealed by a JEOL-2001F field-emission TEM. Electron spectroscopy (XPS) was conducted on a Physical Electronics. PHI 5802 equipped with a monochromatic Al Kα source.

The average oxidation state of $MnO_2$ is calculated according to the following equation:

$$AOS = 8.95 - 1.13 \Delta E \text{ (eV)}$$

where $\Delta E$ stands for the energy difference between the main Mn 3s peak and its satellite peak.

Cyclic voltammetry (CV) curves and electrochemical impedance spectroscopy (100 kHz to 0.1 Hz) were conducted by an electrochemical workstation (CHI 760D). The CV curves of $Zn-MnO_2$ batteries were measured based on the three-electrode system, in which Zn was used as both counter and working electrodes. Electrochemical performance of the as-prepared $Zn-MnO_2$ battery was examined based on galvanostatic testing of CR2032-type coin cells (for aqueous $Zn-MnO_2$ battery) and planar thin film battery (for solid-state $Zn-MnO_2$ battery) in the voltage range of 0.95 V-1.85 V using a Land 2001A battery testing system at 24° C.

Figure 3:
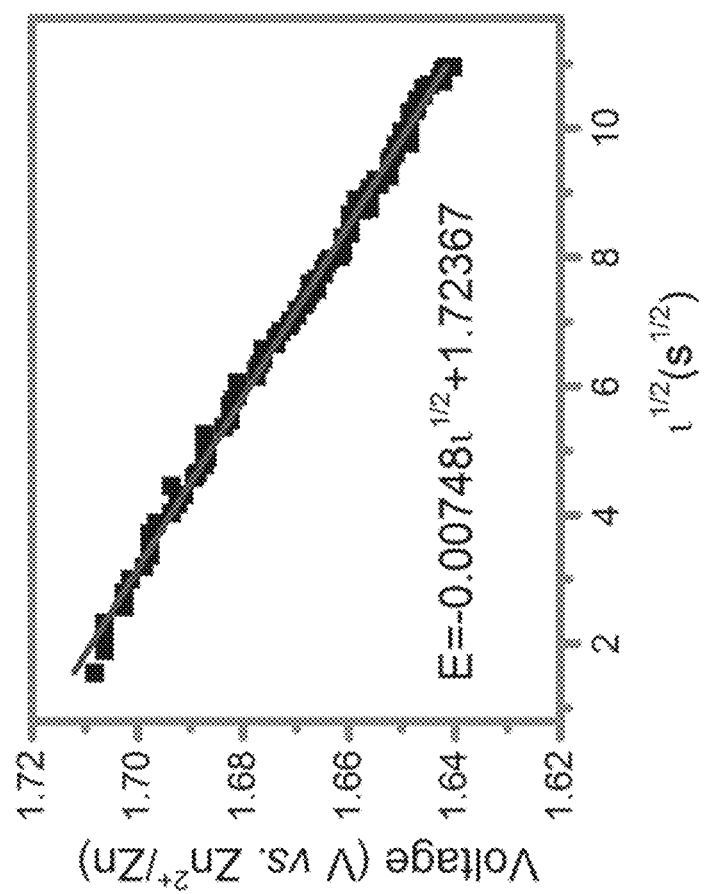
FIG. 3 is a plot showing the linear behavior of the E vs $\tau^{1/2}$ relationship.

The diffusion coefficient of electrolyte ions was measured by using Galvanostatic Intermittent Titration Technique (GITT), as the plot of E versus $\tau^{1/2}$ shows a straight line behavior over the entire time period of current flux (as shown in FIG. 3), then the diffusion coefficient can be calculated based on the following equation:

$$D = \frac{4}{\pi \tau} \left(\frac{m_B V_M}{M_B s}\right)^2 \left(\frac{\Delta E_s}{\Delta E_\tau}\right)^2$$

$$= \frac{4}{\pi \tau} \left(\frac{V_M}{M_B \left(\frac{s}{m_B}\right)}\right)^2 \left(\frac{\Delta E_s}{\Delta E_\tau}\right)^2$$

$$= \frac{4}{\pi \tau} \left(\frac{V_M}{M_B s_{BET}}\right)^2 \left(\frac{\Delta E_s}{\Delta E_\tau}\right)^2$$

where $\tau$ represent the duration of the current pulse (s), $V_M$ is the molar volume of NMOH, which is 103.2 cm$^3$ mol$^{-1}$ from the standard crystallographic data (JCPDS: 80-1098). $M_B$ is the molecular weight, which is calculated for the molecular formula ($Na_{0.44}Mn_2O_4 \cdot 1.4H_2O$), with a value of 209.3 g mol$^{-1}$. The active surface area (S) of the electrode was calculated on the basis of the BET area ($S_{BFT}$). The $\Delta E_x$ and $\Delta E_\tau$ are steady-state voltage change (V) by the current pulse and voltage change (V) during the constant current pulse.

Figure 4A:
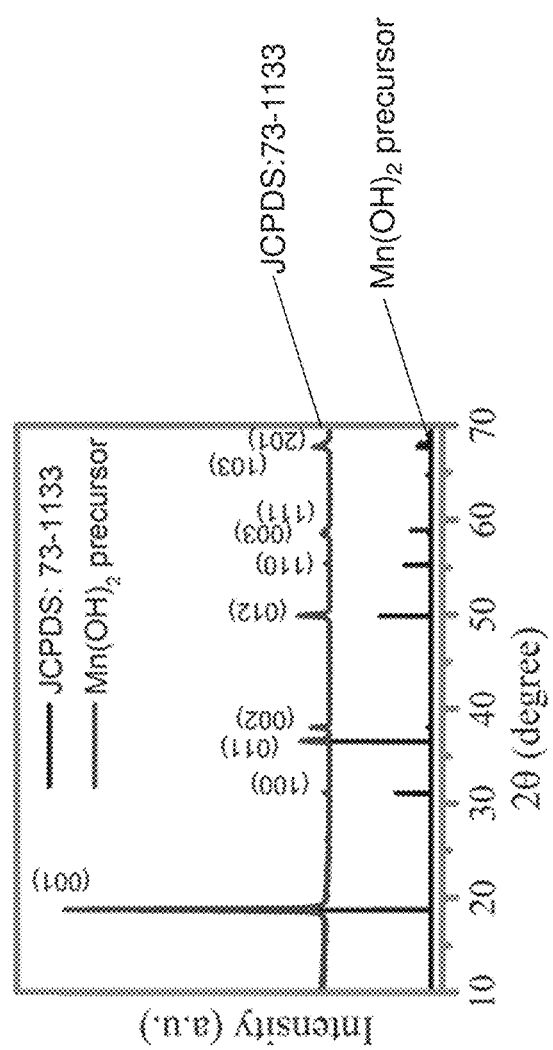
FIG. 4A is a plot showing the XRD patterns of $Mn(OH)_2$ precursors and a standard high crystalline $Mn(OH)_2$ (JCPDS No. 73-1133).
Figure 4B:
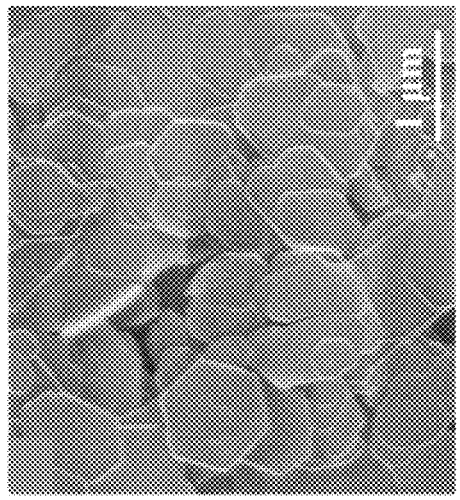
FIG. 4B is a FESEM image showing the morphology of $Mn(OH)_2$ precursors.

The layered $MnO_2$ sample was fabricated through oxidation of $Mn(OH)_2$ nanoplates with NaClO in aqueous solution, during this reaction, $Mn^{2+}$ was oxidized into $Mn^{4+}$, with the $Na^+$ and $H_2O$ intercalated into the structure. The crystallography and morphology of $Mn(OH)_2$ precursors are shown in FIGS. 4A and 4B. As shown in FIG. 4A, the X-ray diffraction (XRD) patterns reveal that the as-prepared precursor is a highly crystalline $Mn(OH)_2$ (JCPDS No. 73-1133); whereas the FESEM image (FIG. 4B) shows that the sample comprises a plurality of hexagonal nanoplates with a thickness of about 50 nm and a lateral dimension of about 100 nm to 1 μm.

Figure 5A:
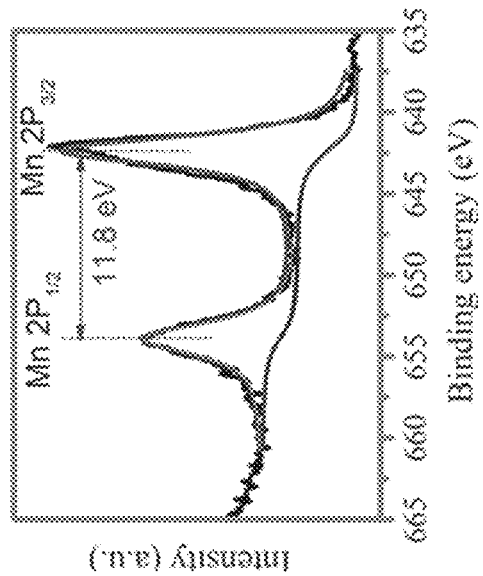
FIG. 5A is a plot showing the XRD patterns of a $MnO_2$ sample in accordance with an embodiment of the present invention and a standard $\delta$-$MnO_2$ (JCPDS: No. 80-1098).

The as-obtained $MnO_2$ sample was also studied by XRD. As shown in FIG. 5A, the characteristic diffraction peaks match well with those of a pure layered $Na_{0.46}Mn_2O_4$ $1.4H_2O$ with a birnessite framework (δ-phase $MnO_2$, JCPDS No. 80-1098), with no obvious impurity peaks being detected. The (001) and (002) peaks are intense and symmetric, corresponding to the layered structure. The sharp feature of the two peaks illustrates the high crystallinity of the $MnO_2$ product.

Figure 5B:
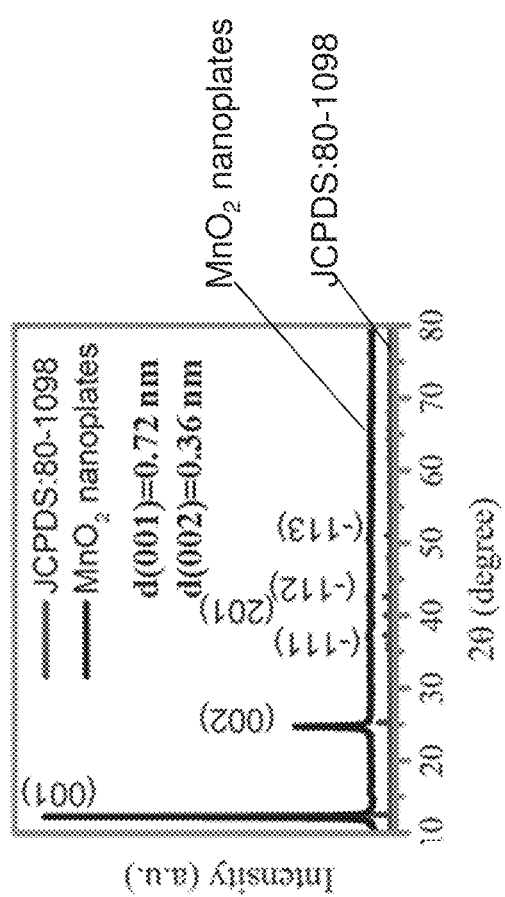
FIG. 5B is a plot of intensity against binding energy showing the XPS profile of Mn 2p of the $MnO_2$ sample of FIG. 5A. The value of 11.8 eV refers to the Mn 2p peak splitting energy of the $MnO_2$ sample.
Figure 5C:
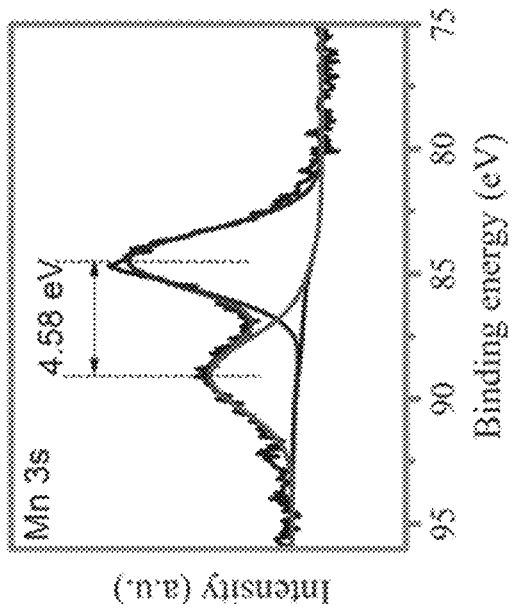
FIG. 5C is a plot of intensity against binding energy showing the XPS profile of Mn 3s of the $MnO_2$ sample of FIG. 5A. The value of 4.58 eV refers to the Mn 2p peak splitting energy of the $MnO_2$ sample.
Figure 5E:
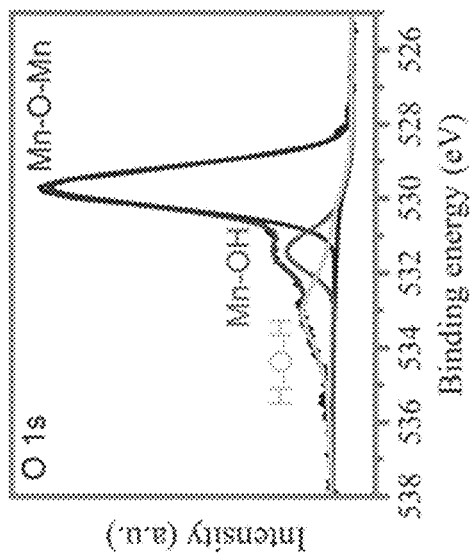
FIG. 5E is a plot of intensity against binding energy showing the XPS profile of O 1s of the $MnO_2$ sample of FIG. 5A.
Figure 5D:
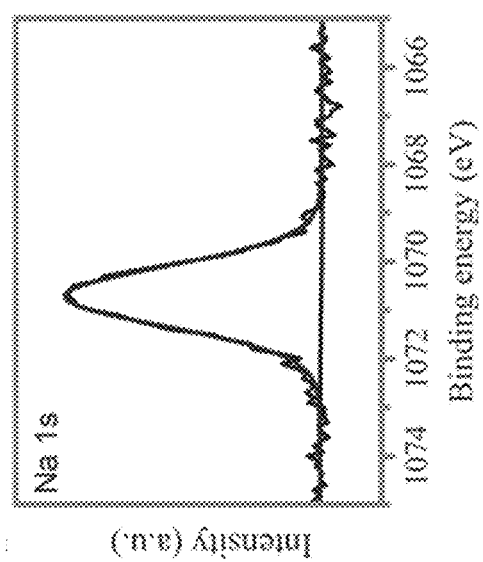
FIG. 5D is a plot of intensity against binding energy showing the XPS profile of Na is of the $MnO_2$ sample of FIG. 5A.

The detailed composition and valence state of Mn were investigated through XPS. As shown in FIGS. 5B and 5C, the splitting energy between the two Mn 2p and 3s peaks are 11.8 eV and 4.58 eV, respectively. The average oxidation state of $MnO_2$ was calculated to be 3.77 based on the splitting energy of Mn 3s peak (FIG. 5C). The presence of Na is confirmed by the appearance peak around 1070 eV (FIG. 5D), the ratio of Na/Mn was calculated to be 0.22. Considering the presence of Na ion and the valence balance of the $MnO_2$, the oxidation state of Mn should be around 3.78, which is very close to the calculated value. The deconvoluted O 1s spectrum (FIG. 5E) can be fitted with the presence of Mn—O—Mn bond (centered at 529.7 eV), Mn—O—H bond (531.5 eV), and H—O—H bond (532.9 eV).

Figure 5F:
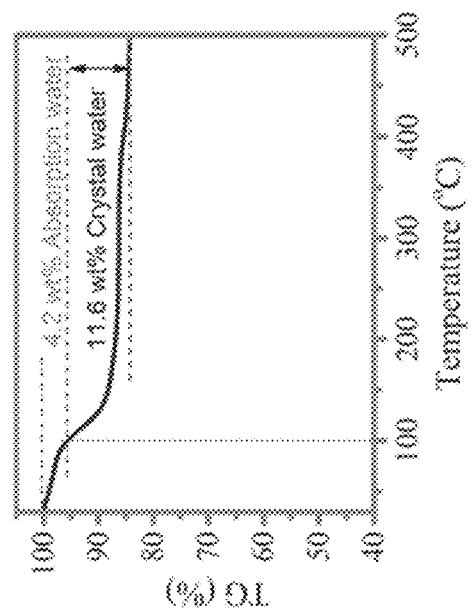
FIG. 5F is a plot of TG against temperature showing the TGA curve of the $MnO_2$ sample of FIG. 5A from room temperature to 500° C.

Subsequently, TG was used to identify the water content of the $MnO_2$ product. As shown in FIG. 5F, there is about 4.2% weight loss up to 100° C., which is mainly due to the physically adsorbed water. Another weight loss of 11.6% appears from 100 to 450° C., confirming the presence of the water present within the structure, with a content of 12.1 wt %. Thus, the molecular formula of the as-prepared product is determined to be $Na_{0.44}Mn_2O_4 \cdot 1.5H_2O$ (NMOH), which is close to the composition of standard layered $Na_{0.46}Mn_2O_4 \cdot 1.4H_2O$ (JCPDS No. 80-1098).

Figure 6A:
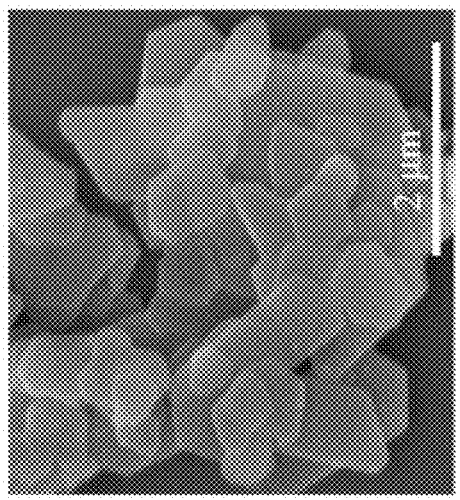
FIG. 6A is a SEM image of the layered $MnO_2$ intercalating Na ion and water molecule.
Figure 6B:
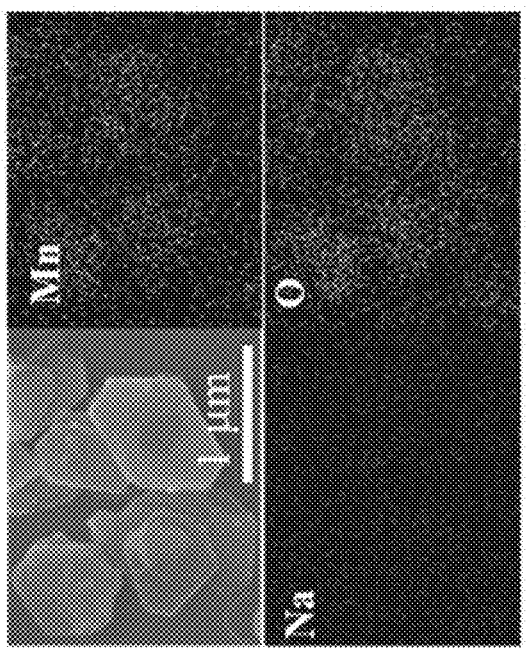
FIG. 6B an EDX image of the layered $MnO_2$ of FIG. 6A.
Figure 6D:
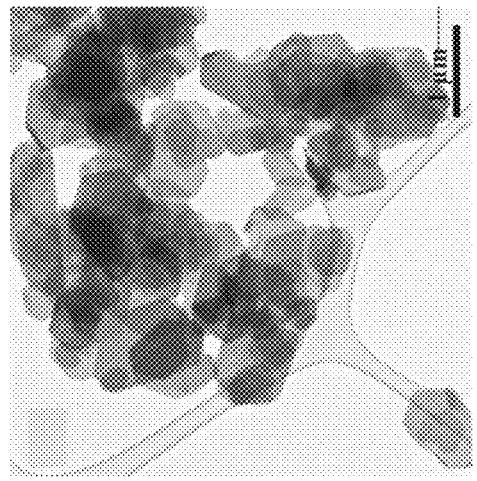
FIGS. 6C to 6E is a set of TEM images of the layered $MnO_2$ of FIG. 6A.
Figure 6E:
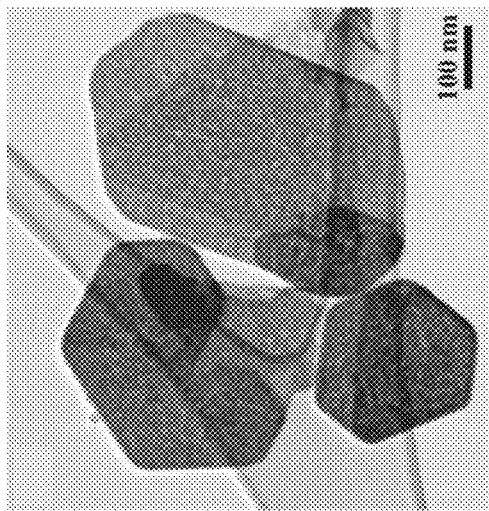
Figure 6C:
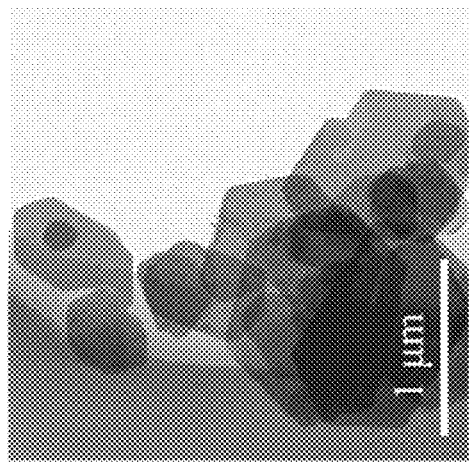

FESEM, energy dispersive X-ray (EDX) element mapping and TEM were performed to confirm the morphology and microstructures of NMOH. The FESEM image (FIG. 6A) shows that the $NMO \cdot H_2O$ sample consists of massive hexagonal nanoplates with irregular shapes. These nanoplates possess clean and smooth surfaces. EDS element mappings (FIG. 6B) of the NMOH sample show that the Mn, O, and Na elements distribute in the sample homogeneously. TEM images (FIGS. 6C to 6E) further illustrate the irregular hexagonal nanoplate morphology of NMOH, with a side-length from 100 nm to 300 nm.

Figure 7A:
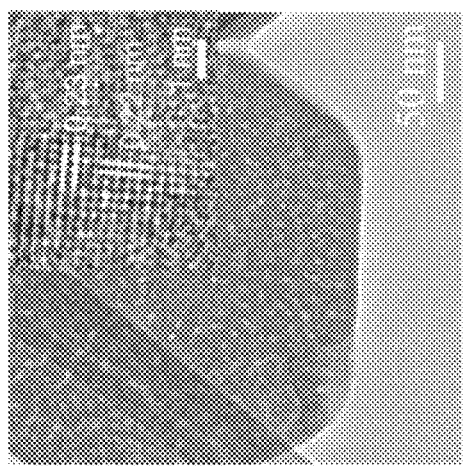
FIG. 7A is a HRTEM image of the layered $MnO_2$ of FIG. 6A. The insert indicates the lattice fringe spacing.
Figure 7B:
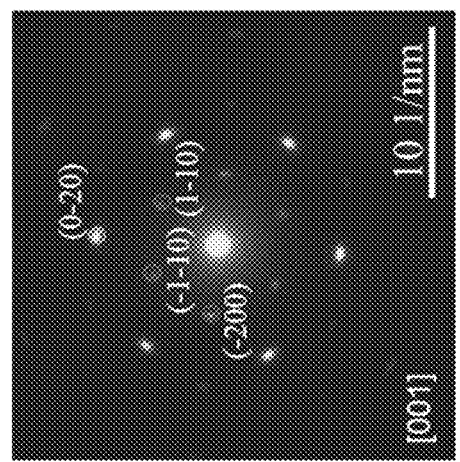
FIG. 7B is a SEAD image showing the orientation of the layered $MnO_2$ of FIG. 6A.

The lattice fringe can be clearly observed in the HRTEM image (FIG. 7A), with a spacing of 0.23 nm and 0.22 nm, which corresponds to the (−111) and (201) planes of NMOH, regardless of the orientations of the crystalline domains. Lattice fringes with a larger spacing corresponding to the (001) and (002) planes are not observed in the HRTEM image, indicating that the crystalline (001) direction might be perpendicular to the basal surfaces of the nanoplate. The corresponding SEAD is shown in FIG. 7B and it confirms that the orientation of the nanoplate is perpendicular to [001].

Due to the spacious layer channels offered by this unique structure with the intercalated $Na^+$ and solvent water, it is expected that the sample may be capable of performing as an excellent host for Zn ion insertion. To investigate this property, a coin cell was assembled using the obtained NMOH sample as the cathode, 2 M $ZnSO_4$+0.2 M $MnSO_4$ solution as the electrolyte, Zn plate as the anode. The electrochemical performance was tested by cyclic voltammetric (CV).

Figure 8A:
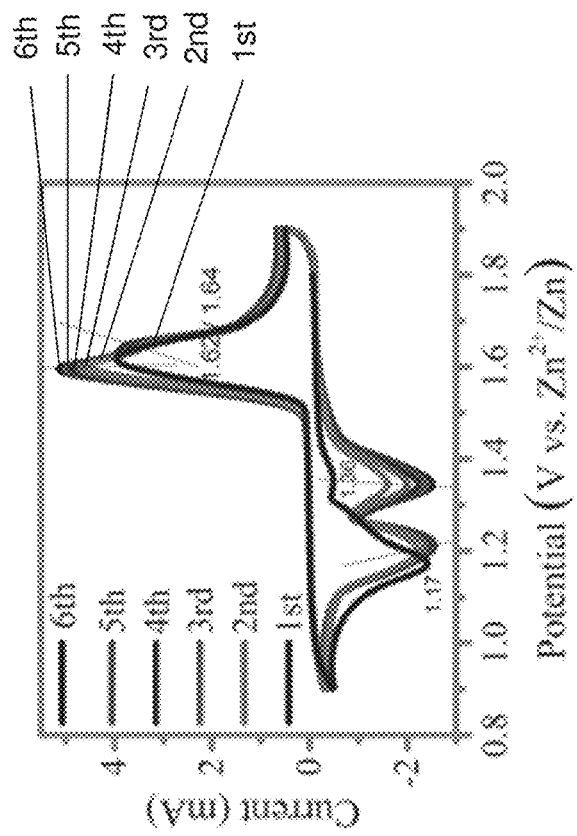
FIG. 8A is a cyclic voltammogram showing the cyclic voltammetry curves of a Zn-NMOH battery in 2 M $ZnSO_4$ and 0.2 M $MnSO_4$ at a scan of 1 mV $s^{-1}$.

As shown in FIG. 8A, in the first cycle, two reduction peaks separately locate at 1.36 V and 1.17 V and an overlapped oxidation peak lies in 1.62/1.64 V, in the following cycles, the reduction peak located around 1.2 V shifts positively while the oxidation peak around 1.60 V shifts negatively, this difference is ascribed to the large overpotential required to activate in the first cycle. These shifts narrow the potential window between the oxidation and reduction, suggesting a more reversible electrochemical cycling process. Furthermore, as the cycling proceeds, the intensity of the reduction peak at around 1.35 V and the oxidation peak at 1.6 V increase obviously, demonstrating an activation process of discharge and charge.

Figure 8B:
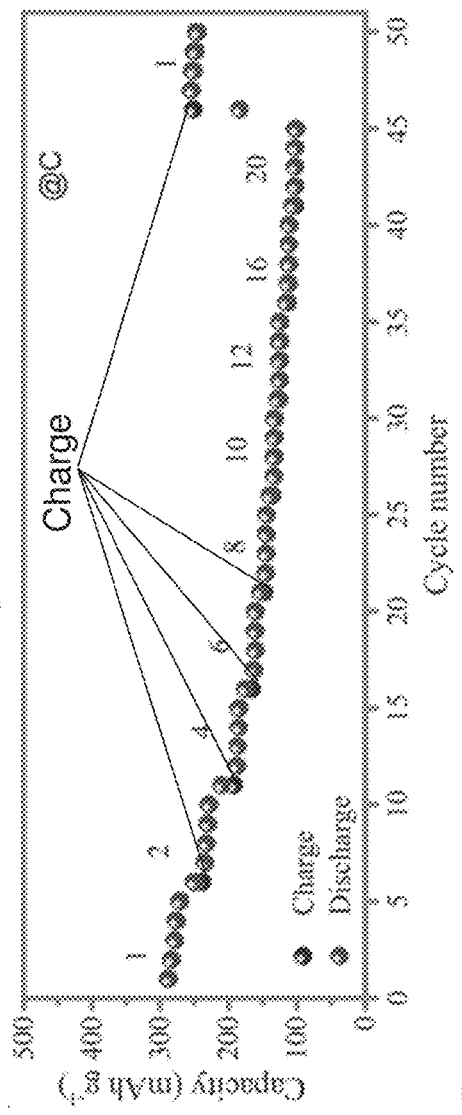
FIG. 8B is a plot of capacity against cycle number showing the cycling performance of the Zn-NMOH battery of FIG. 8A at various C-rates (1 C-20 C).

The rate capability of the aqueous Zn—MnO$_2$ battery was evaluated from 1 C to 20 C with the voltage range from 0.95 V to 1.85 V. As shown in FIG. 8B, at 1 C (1 C=0.380 mA·g$^{-1}$), the NMOH electrode delivers a reversible capacity of average 278 mAh·g$^{-1}$, which is close to 90% of its theoretical capacity (308 mAh·g$^{-1}$). As the rate increases, values of 232, 187, 161, 145, 134, 125, 111 and 103 mAh g$^{-1}$ were measured as the reversible discharge capacity at 2, 4, 6, 8, 10, 12, 16 and 20 C, respectively. The average capacity at 20 C is 37.1% of that at 1 C, owing to the favorable layered structure benefits the fast insert/extract of electrolyte ions. In addition, when the rate returns from 20 C to 1 C, the discharging capacity recovers to 253 mAh g$^{-1}$, 91% of the initial capacity is preserved. All these results demonstrate a superior rate capability of the NMOH materials.

Figure 8C:
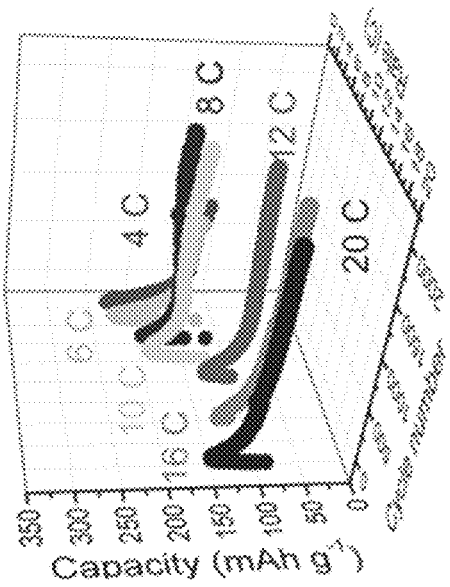
FIG. 8C is a plot of voltage against capacity showing the discharge and charge voltage profiles of the Zn-NMOH battery of FIG. 8A at various C-rates between 0.95 and 1.85 V vs. $Zn^{2+}$/Zn.

The discharge-charge curves corresponding to different rates are exhibited in FIG. 8C, at 1 C, the NMOH cathode delivers a safe voltage of 1.45 V versus Zn$^{2+}$/Zn and a sloping plateau at around 1.4 V followed with a flat plateau at ca. 1.2 V. It is appreciated that the first voltage plateau is dominated by H$^+$ insertion whereas the second one corresponds to the Zn$^{2+}$ insertion. In addition, as the rate increases, the contribution to discharge capacity due to H ion insertion improves. This is expected since H ion has a much higher diffusion coefficient than Zn ion as a result of the apparent ion radii difference. Furthermore, the characteristic plateaus can still be easily distinguished in the charge-discharge curves even at the high current density of 20 C (6.16 A·g$^{-1}$).

Figure 8D:
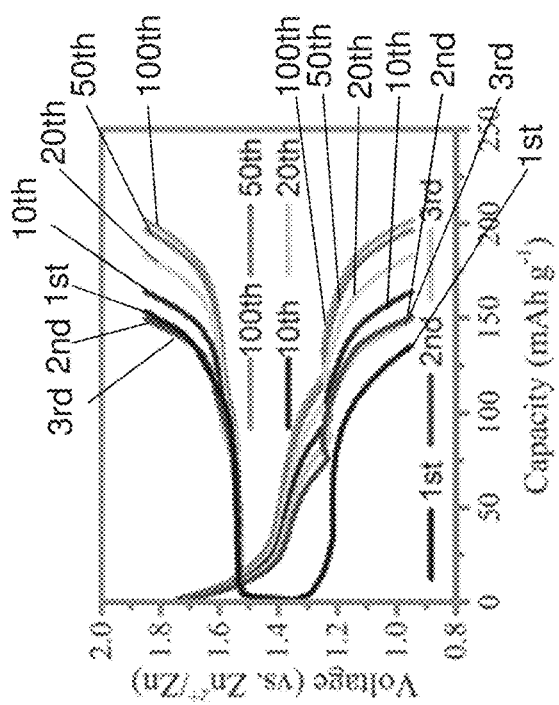
FIG. 8D is a 3D plot showing the long-term cycling performance of the Zn-NMOH battery of FIG. 8A at different C-rates (4 C-20 C).
Figure 8E:
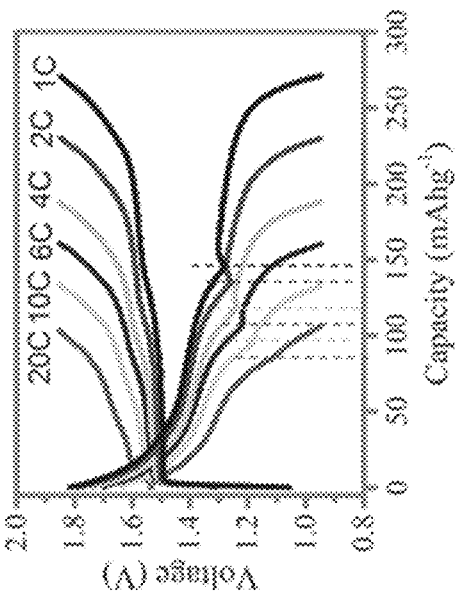
FIG. 8E is a plot of voltage against capacity showing the discharge-charge voltage profiles of the Zn-NMOH battery of FIG. 8A at 10 C at different cycles (1st, 2nd, 3rd, 10th, 20th, 50th and 100th).

The stability of the NMOH electrode at various rates of 4 C, 6 C, 8 C, 10 C, 12 C, 16 C, and 20 C is further evaluated. As shown in FIG. 8D, 87%, 100% retention were observed after 1000 cycles for 4 C and 6 C, respectively. When the current is raised to a high rate of 10 C and 20 C, surprisingly the cell still displays a highly stable performance. An enhancement was observed at all rates as revealed in FIG. 8D. Taking 10 C as an example, the discharge-charge curves at different cycles are selected and presented in FIG. 8E, the Zn-NMOH battery delivers a safe voltage of 1.4 V versus Zn$^{2+}$/Zn and an initial capacity of 135.4 mAh·g$^1$, as displayed in FIG. 8E, the discharge capacities grow gradually during the activation process of the first 100 cycles, which can be illustrated as the first plateau enlongates with the cycle number (FIG. 8E). This increase in the capacity is attributed to the gradual activation of electrodes, which is very common for Zn—MnO$_2$ batteries in the ZnSO$_4$+MnSO$_4$ electrolyte.

Figure 9A:
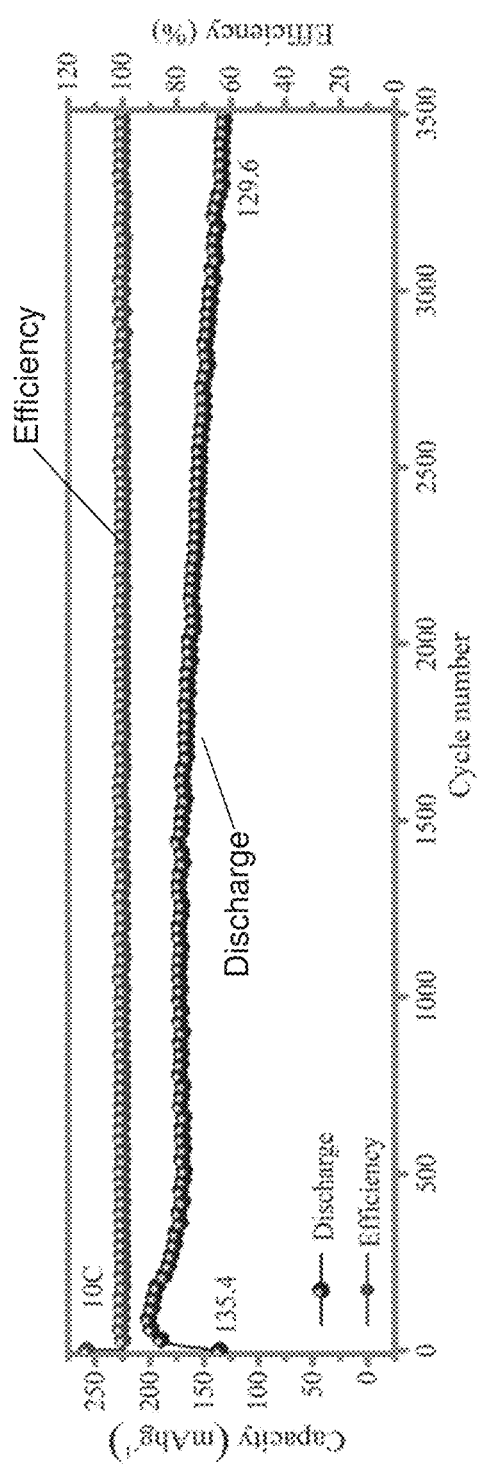
FIG. 9A is a plot of capacity against cycle number showing the long-term cycling performance of the Zn-NMOH battery of FIG. 8A at 10 C.
Figure 9B:
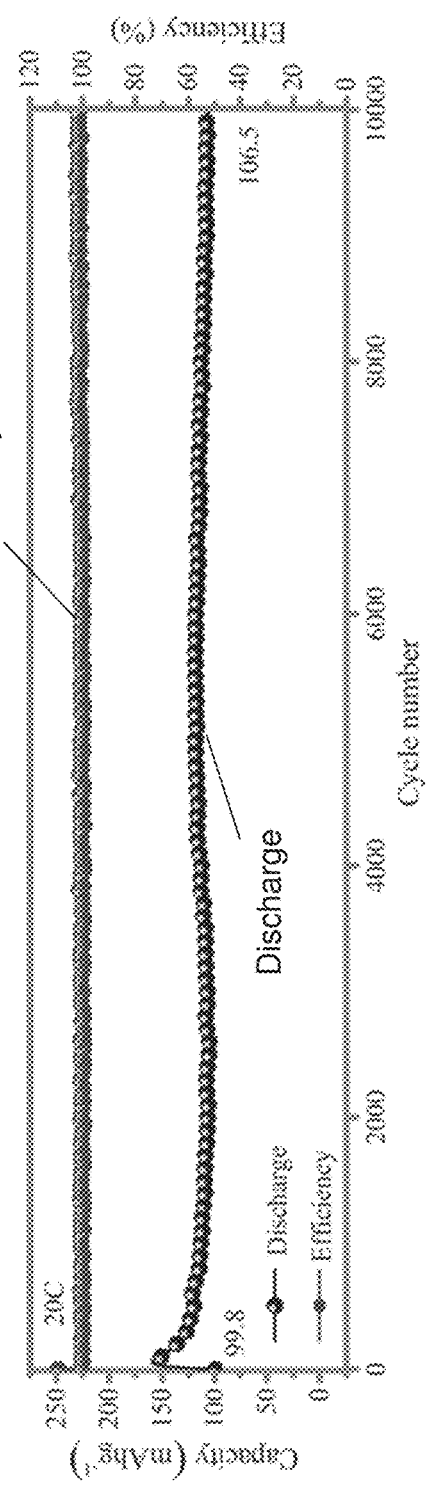
FIG. 9B is a plot of capacity against cycle number showing the long-term cycling performance of the Zn-NMOH battery of FIG. 8A at 20 C.

The Zn-NMOH battery was further evaluated for long term cycling performance at 10 C and 20 C. As shown in FIG. 9A, the initial capacity at 10 C is 135.4 mAh·g$^{-1}$, after 3500 cycles, a capacity of 129.6 mAh g$^{-1}$ is still obtained, with 96% retention. Surprisingly, when the current is further raised to 20 C, an initial discharge capacity of 99.8 mAh g$^{-1}$ is measured and then it gradually grows to around 160 mAh g$^{-1}$ within the 50th and 80th cycles. After 10000 cycles, the discharge capacity is still found to be 106.5 mAh g$^{-1}$ (FIG. 9B). This decent cycling performance may surpass traditional MnO$_2$ in the ZnSO$_4$ electrolyte. This outstanding performance suggests the high stability of this layered skeleton with Na and water being intercalated, which provides a large channel for the fast kinetics of H$^+$ and Zn$^{2+}$ intake and release. Thus, fast transport and a long-term insertion/extraction for H and Zn ions are allowed.

Figure 10A:
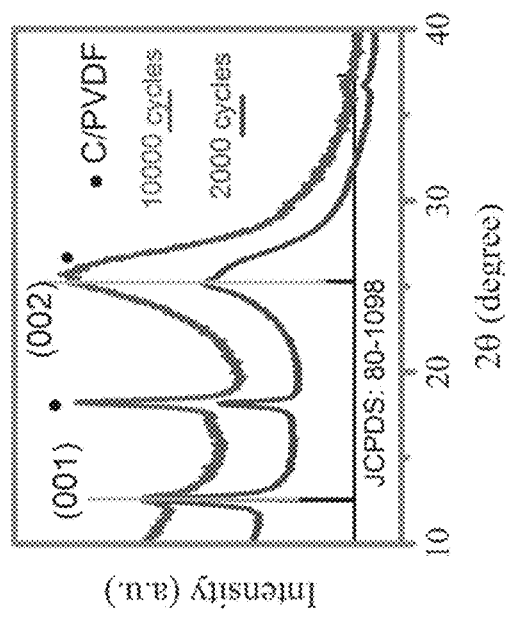
FIG. 10A is a plot showing the XRD patterns of the NMOH cathode after cycled for 2000 cycles and 10000 cycles at 20 C.
Figure 10B:
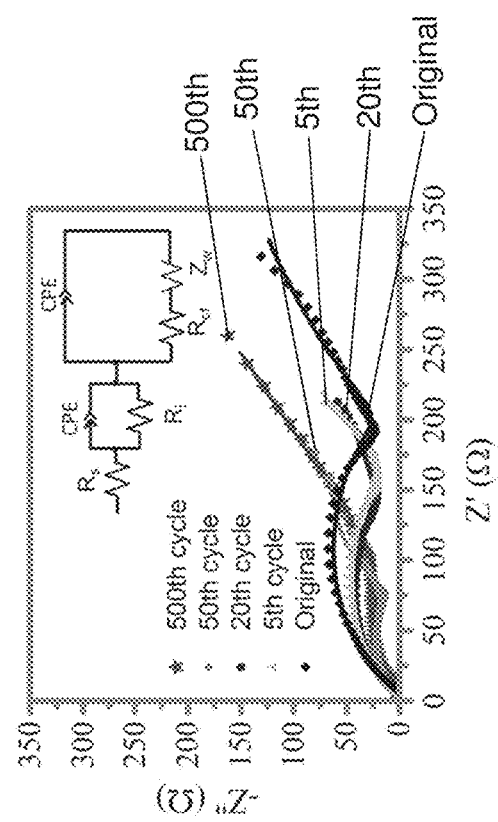
FIG. 10B is an EIS plot of Zn-NMOH battery of FIG. 8A at different cycling numbers.

The high stability of the layered structure was also tested using XRD measurement. As shown in FIG. 10A, the two characteristically symmetric peaks of (001) and (002) persist well after 2000 cycles and even 10000 cycles. To further clarify the activation, EIS analysis was performed on the Zn-NMOH battery at different cycles, the result shows that the change of impedance is in accordance with the capacity change (FIG. 10B). It reveals that the decrease of charge transfer resistance is responsible for the activation.

Figure 11A:
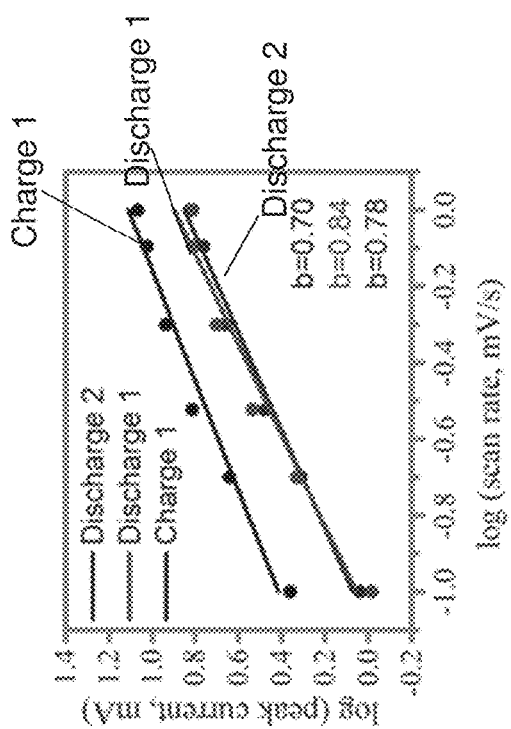
FIG. 11A is a cyclic voltammogram showing the cyclic voltammetry curves of the NMOH electrode at different scan rates.
Figure 11B:
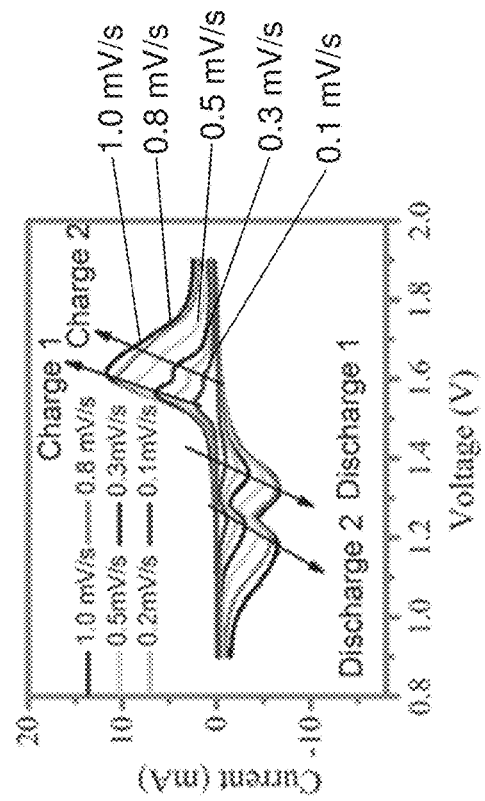
FIG. 11B is a plot of log(current) against log (scan rate) of the three peaks corresponding to the cyclic voltammetry curves of FIG. 11A during the cycles.

The high rate performance and long-term stability of Zn-NMOH batteries significantly rely on their kinetics origin, which was studied by CV characterizations in detail. The CV curves of Zn/NMOH battery are shown in FIG. 11A, with the presence of two discharge peaks and two charge peaks. The scan rate and peak current have been proved to obey a relationship as follows:

$$i = av^b \quad (1),$$

it can be rewritten as: log(i)=blog(v)+log(a)

where i refers to current, v stands for scan rate, and a and b represent adjustable parameters. Through fitting a plot log(i) versus log(v) as shown in FIG. 11B, the coefficient b for peaks 1, 3 and 4 can be determined according to the slope of the linear regression lines, with values of 0.70, 0.84, and 0.78, respectively. (As peak 2 became a shoulder at higher scan rate, its peak intensity is able to measure.) The result indicates that the electrochemical reaction of Zn-NMOH is controlled by pseudocapacitance and ionic diffusion within the scanning rate ranging from 0.1 to 1 mV s$^{-1}$. This characteristic is responsible for the high rate performance of the Zn-NMOH batteries.

Figure 11C:
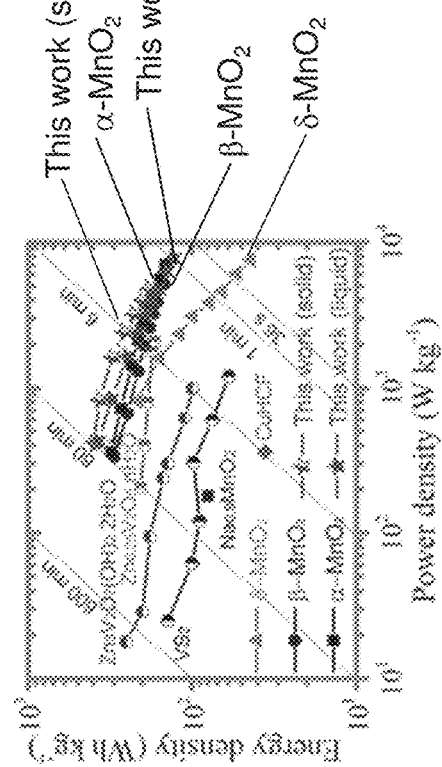
FIG. 11C is a Ragone plot of the Zn-NMOH cell of FIG. 8A, in comparison with other aqueous ZIBs, including Zn—$VS_2$, Zn—CuHCF, $Zn_{0.25}V_2O_5 \cdot nH_2O$, $Zn_3V_2O_7(OH)_2 \cdot 2H_2O$, Zn—$Na_{0.95}MnO_2$, α-$MnO_2$, β-$MnO_2$, and δ-$MnO_2$.
Figure 12A:
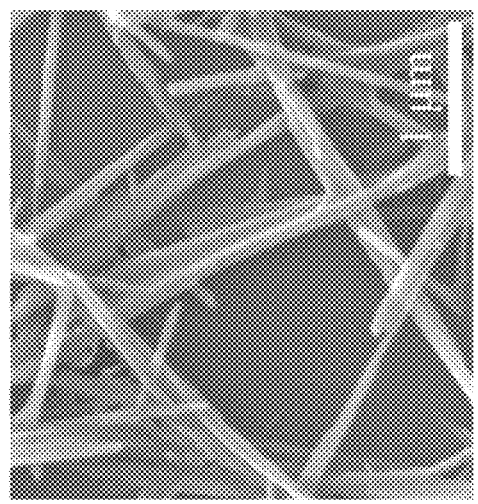
FIG. 12A is a plot showing the XRD patterns of an α-$MnO_2$ sample and a β-$MnO_2$ sample.
Figure 12B:
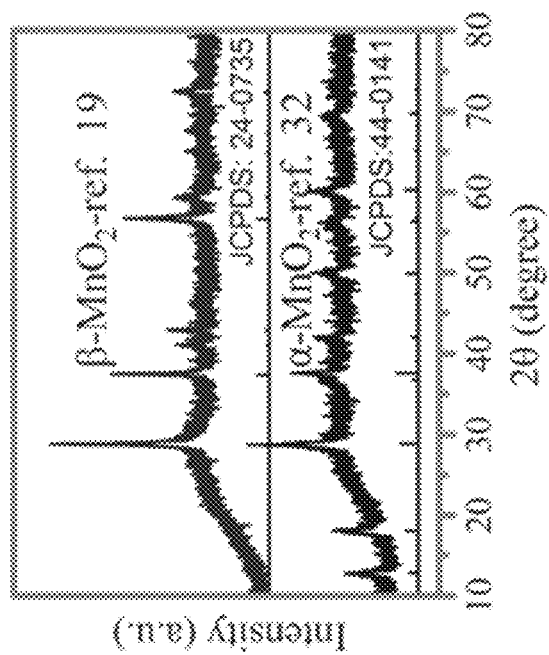
FIG. 12B is a SEM image of the α-$MnO_2$ sample.
Figure 12C:
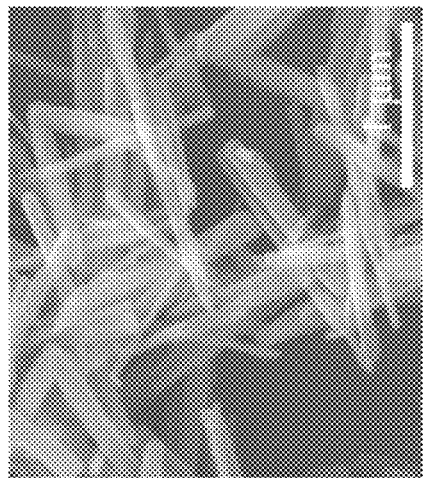
FIG. 12C is a SEM image of the β-$MnO_2$ sample.
Figure 12D:
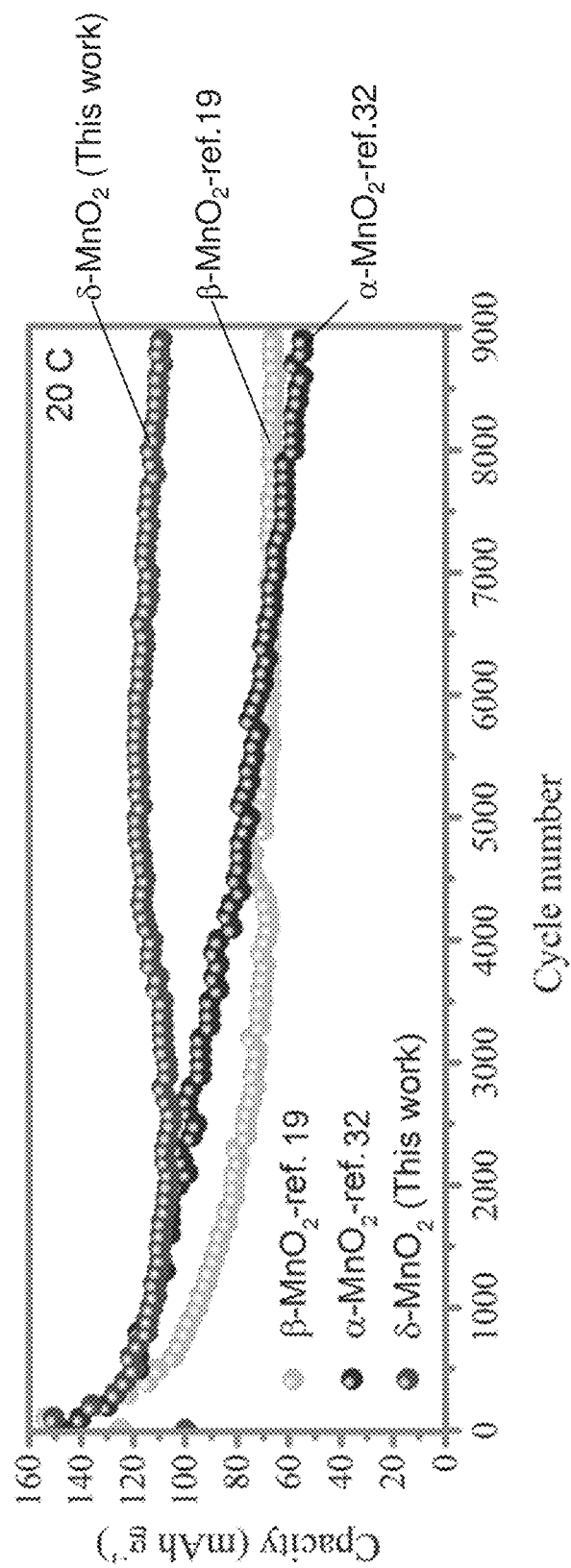
FIG. 12D is a plot of capacity against cycle number showing the long-term cycling performance of the α- and β-$MnO_2$ samples in comparison with the layered $MnO_2$ sample of the present disclosure at 20 C.

The high energy and high power densities of NMOH are further evident in the Ragone plot, in comparison to VS$_2$, CuHCF, Zn$_{0.25}$V$_2$O$_5$.nH$_2$O, Zn$_3$V$_2$O$_7$ (OH)$_2$.2H$_2$O, Na$_{0.9}$MnO$_2$, and δ-MnO$_2$. As shown in FIG. 11C, NMOH exhibits the highest energy density while limiting the discharge time within 1 min, and delivers high power densities from 425 to 7775 W kg$^{-1}$. In addition, NMOH can achieve an energy density of 374 Wh kg$^{-1}$ at 308 mA g$^{-1}$ and maintains at ≈130 Wh kg$^{-1}$ with a power density of 7.8 kW kg$^{-1}$. The power density and energy density of the NMOH cathode is comparable to the α-MnO$_2$ and β-MnO$_2$ cathodes for mild Zn—MnO$_2$ batteries. A further comparison of the MnO$_2$ cathodes with the NMOH cathode is shown in FIGS. 12A to 12D. A significant advancement in cycle life is noted for the NMOH sample (FIG. 12D). In particular, after cycling for 9000 cycles at 20 C, the NMOH nanoplate of the present disclosure still delivers a high capacity of 120 mAh g$^{-1}$, whereas the α- and β-MnO$_2$ samples only deliver a discharge capacity of 51 and 63 mAh g$^{-1}$, respectively. The result provides the advantage of the layered channel at high rate charge-discharge process.

Figure 13A:
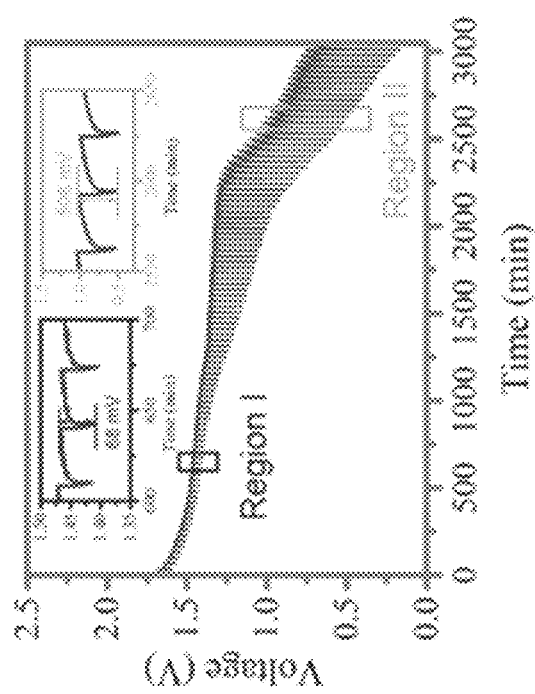
FIG. 13A is a plot of voltage against time showing the discharge GITT profiles of the Zn-NMOH cell of FIG. 8A (0.5 C for 120 s followed by a 0.5 h rest).

As mentioned above, a two-step discharge process was detected in both the CV and charge-discharge curves. Galvanostatic intermittence titration techniques (GITT) was applied to investigate the kinetic behaviors of the Zn-NMOHO battery. As shown in FIG. 13A, the voltage changes upon a pulse of 0.5 C for 120 s followed by a rest of 30 min until the voltage was met. As shown in FIG. 13A, it is revealed that the total overvoltage in the region I is only 0.068 V, whereas the total overvoltage is 0.508 V in region II, which is about ten times of the value in region I. The much larger overvoltage in region II is considered as a result of both large voltage jump and slow ion diffusion. Considering the smaller size of H$^+$ as compared with Zn$^{2+}$ and the fact that the two foreign ions H$^+$ and Zn$^{2+}$ are capable of inserting into the MnO$_2$ structures, it is believed that the first discharge plateau is caused by the $H^+$ insertion, whereas the second voltage plateau mainly results from the $Zn^{2+}$ insertion.

Figure 13B:
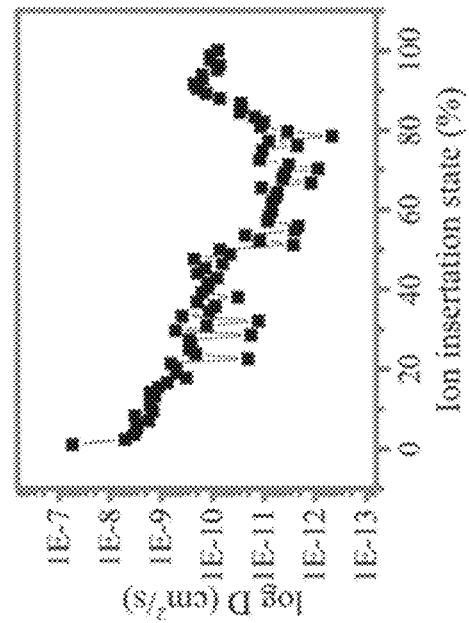
FIG. 13B is a plot of log(D) against ion insertion state showing the corresponding diffusivity coefficient (D) of $H^+$ and $Zn^{2+}$ in the discharge process of FIG. 13A.

The corresponding ion diffusion coefficient was also calculated. As shown in FIG. 13B, the coefficient decreases along with the ion insertion, and the value in the first region (below 50% ion insertion state) ($10^{-7}$) is much larger than the second one ($10^{-8}$), which further confirms that the discharge process consists of both $H^+$ insertion and $Zn^{2+}$ insertion.

Ex situ XRD measurements were performed on the NMOH cathode at different stages so to determine the crystal structure evolution during the discharge-charge process. As shown in FIG. 14A, when the cell was discharged to 1.35 V at 0.3 C, the layered structure remains intact in view of the presence of symmetric (001) and (002) peaks without any impurity. A series of new peaks appeared when the cell was further discharged to 0.95 V, which can be well indexed to $Zn_4SO_4(OH)_6 \cdot 4H_2O$ (JCPDS: 39-0688). The peaks assigned to $Zn_4SO_4(OH)_6 \cdot 4H_2O$ disappeared after the cell was charged to 1.85 V, suggesting that the pristine structure of the cathode is recovered.

The presence of $Zn_4SO_4(OH)_6 \cdot 4H_2O$ was further confirmed by SEM and EDX. As shown in FIG. 14B, large nanosheets were observed on the surface of the cathode. The composition of the nanosheets was confirmed by EDS measurement, as shown in FIG. 14C, a large amount of Zn and S was detected with a molar ratio of 3.6. After removing the $Zn_4SO_4(OH)_6 \cdot 4H_2O$ with dilute acetic acid, the peak pattern was assemble to that of layered structure of $MnO_2$ discharged to 0.95 V. No peaks attributing to spinel $ZnMnO_2$ or MnOOH was detected, compared with the standard patterns in FIG. 15A.

Figure 15A:
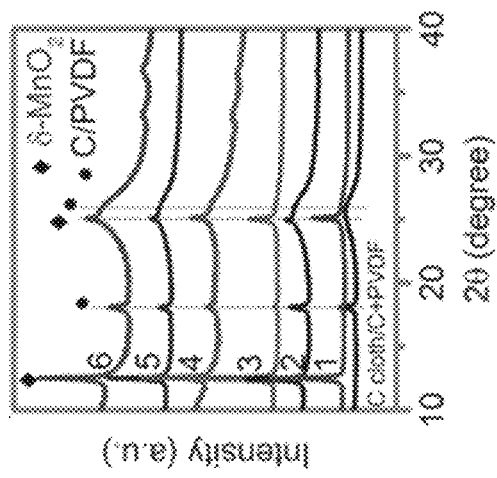
FIG. 15A is a plot showing the standard XDS patterns of layered $Zn_xMnO_2$, layered MnOOH, layered $MnO_2$, and $ZnMn_2O_4$ for comparison.
Figure 15B:
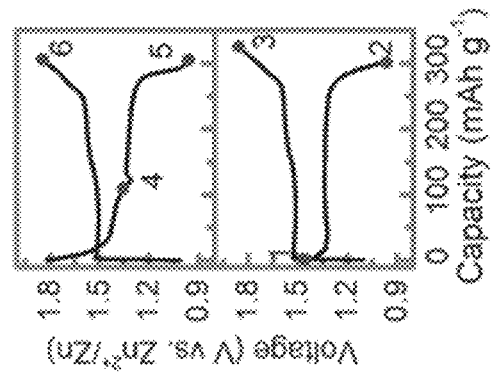
FIG. 15B is a plot showing the ex-situ XRD patterns of the NMOH cathode in different discharge/charge states.
Figure 15C:
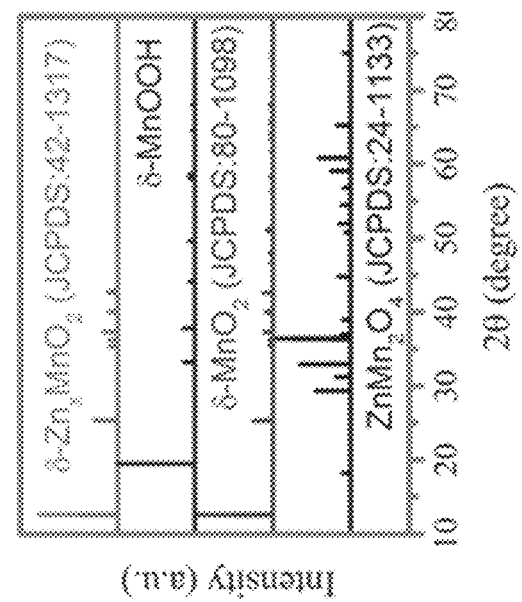
FIG. 15C is a magnified plot showing the ex-situ XRD patterns of the NMOH cathode at 2θ=12–13 corresponding to FIG. 15B.
Figure 15D:
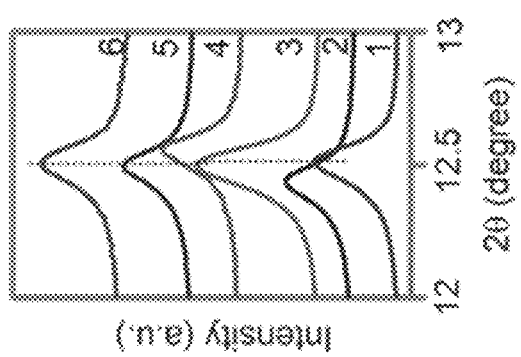
FIG. 15D is a plot of voltage against capacity showing the discharge-charge profiles of the NMOH cathode for the initial two cycles at 0.3 C corresponding to FIG. 15A.

The XRD patterns of the products at different discharge-charge stages are shown in FIGS. 15B and 15C whereas the corresponding discharge-charge profiles of the NMOH cathode at 0.3 C is shown in FIG. 15D. As shown in FIG. 15B, the layered structure remains intact during the discharge and charge process in view of the unchanged peak patterns. After discharging the cell to 1.35 V, the (001) peak shifted to a higher angle while it is shifted back to a small angle after discharging the cell to 0.95 V, as revealed in FIG. 15C.

Due to the significant difference between the size of $H^+$, $Na^+$, and $Zn^{2+}$, the interlayer of the NMOH may shrink after the $H^+$ insertion, which can be confirmed by comparing the peak positions of δ-MnOOH with δ-$MnO_2$ in FIG. 15A. In contrast, the interlayer expands after Zn ion ingression, which is a consequence of the much larger radii of Zn ion. The result further confirms the sequential insertion of $H^+$ and $Zn^{2+}$ during discharge. Interestingly, no obvious peaks change of the layered NMOH was measured, suggesting that no crystal structure change during the discharge-charge process.

Figure 16:
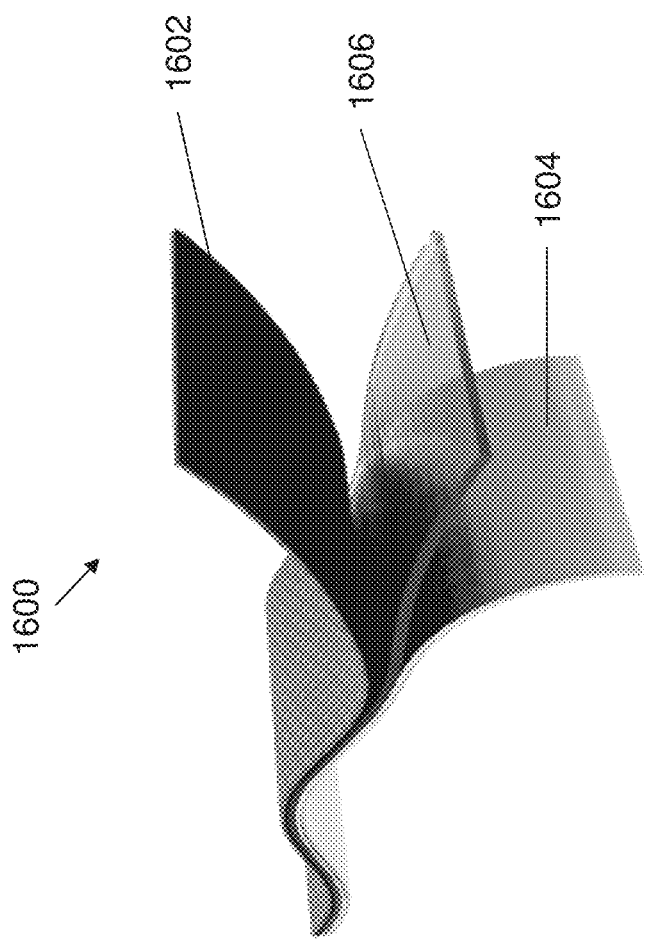
FIG. 16 is a schematic representation of a Zn—$MnO_2$ battery in accordance with one embodiment of the present invention.
Figure 17A:
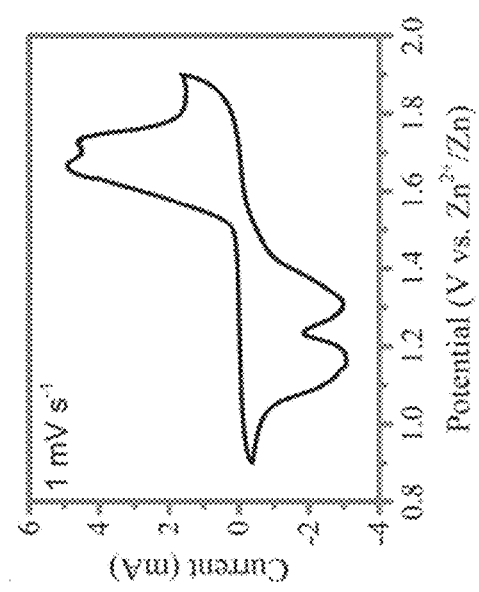
FIG. 17A is a cyclic voltammogram showing the cyclic voltammetry curves of the Zn—$MnO_2$ battery of FIG. 16.
Figure 17B:
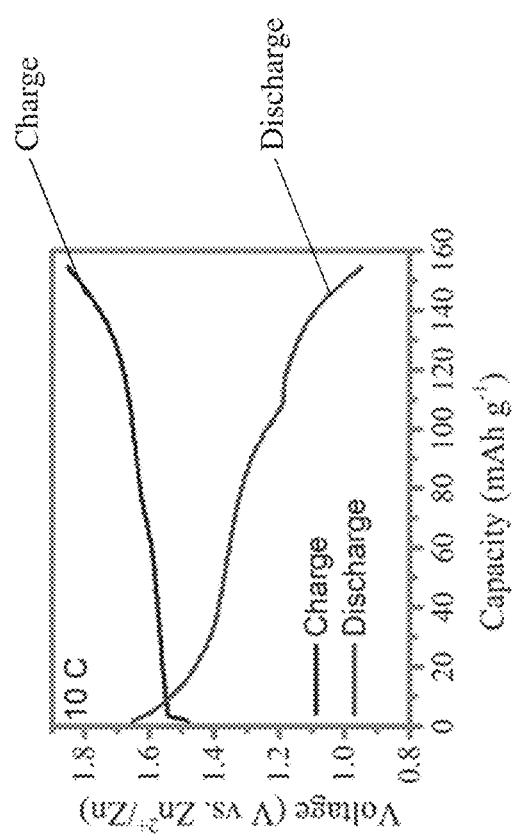
FIG. 17B is a plot of voltage against capacity showing the discharge-charge curves of the Zn—$MnO_2$ battery of FIG. 16.
Figure 17D:
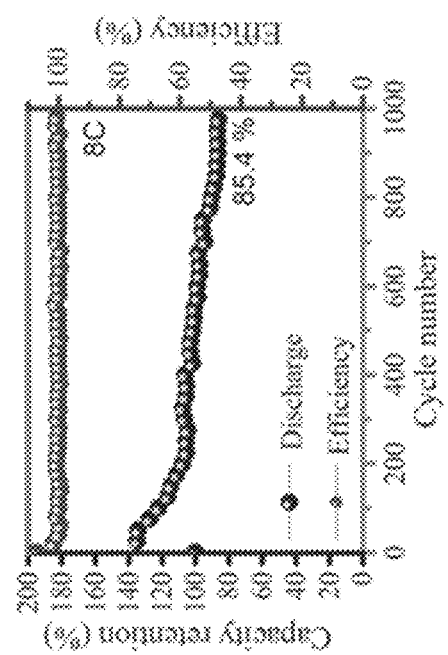
FIG. 17D is a plot of capacity retention against cycle number showing the long-term cycling performance of the Zn—$MnO_2$ battery of FIG. 16 at 8 C.
Figure 17C:
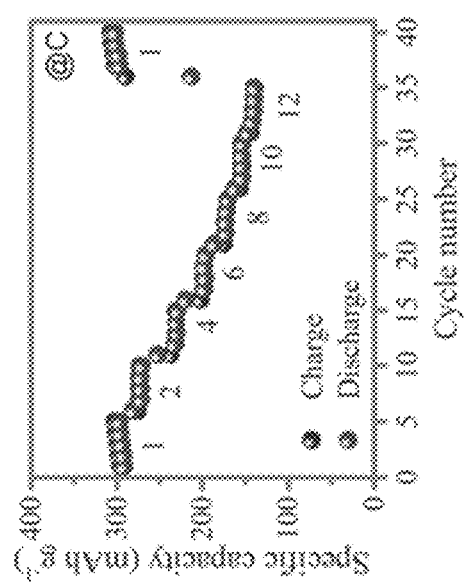
FIG. 17C is a plot of specific capacity against cycle number showing the cycling performance of the Zn—$MnO_2$ battery of FIG. 16 at various C-rates (1 C-12 C).
Figure 17E:
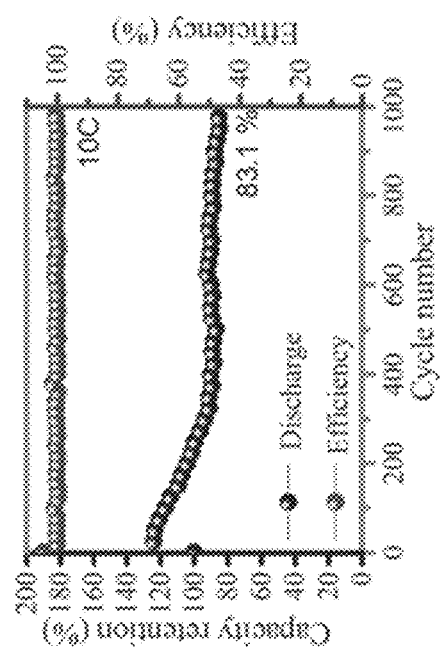
FIG. 17E is a plot of capacity retention against cycle number showing the long-term cycling performance of the Zn—$MnO_2$ battery of FIG. 16 at 10 C.

A quasi-solid-state Zn-NMOH battery 1600 based on PAM hydrogel electrolyte was prepared and illustrated in FIG. 16. The battery 1600 includes a $MnO_2$/carbon cloth cathode 1602 and an anode of an electrodeposited zinc sheet on carbon cloth 1604 sandwiching the PAM hydrogel electrolyte 1606. The electrochemical properties of the battery 1600 were evaluated and the results are shown in FIGS. 17A to 17E. Even with the use of hydrogel electrolyte, the Zn-NMOH cell is still capable of exhibiting the characteristic two-step discharge process, as exhibited by the CV curves and discharge-charge curves in FIGS. 17A and 17B. The rate capability of battery 1600 (FIG. 17C) within the range of 1 C to 12 C was also highly assemble to that of the aforementioned coin cell which used a liquid electrolyte (FIG. 8B).

The stability of the battery 1600 was also evaluated at 8 C and 10 C. After 1000 cycles, 85.4% (FIG. 17D) and 83.1% (FIG. 17E) of its initial capacity remained.

Figure 18A:
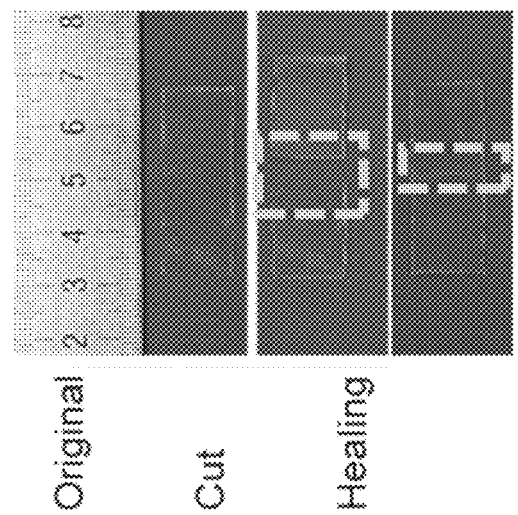
FIG. 18A is a series of optical images demonstrating the self-healing process of carboxylated PU.
Figure 18B:
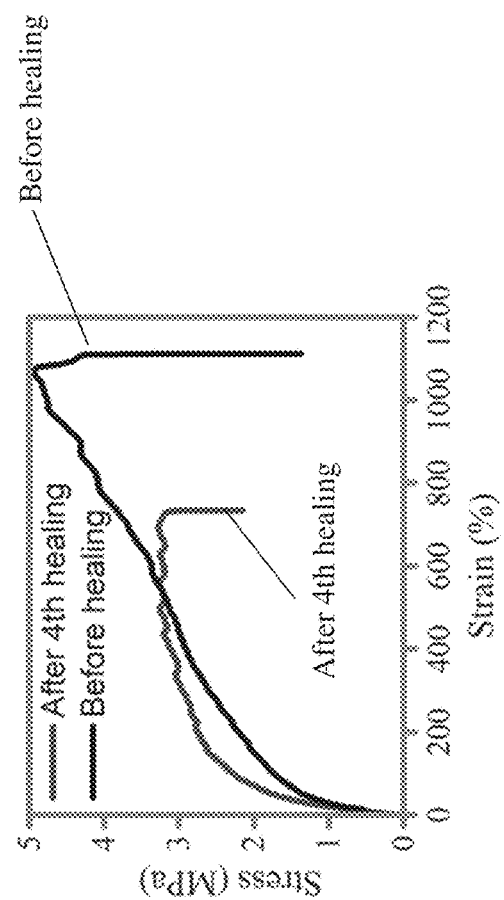
FIG. 18B is a plot of stress against strain showing the results of tensile measurements of the original PU and after 4 times of cutting and healing.

It is appreciated that polyurethane (PU) may possess self-healing property that is highly useful for increasing durability of flexible and/or wearable electronic devices. In this regard, the self-healing property of a PU film was investigated. As shown in FIG. 18A, the PU film was first cut into two half parts, followed by being rejoined and pressed gently within tens of seconds. After 5 mins, the wounds were healed successfully with only a liner scar retained on surface. The comparable stress-strain curves of the PU film before and after the 4th cut/self-healing cycle further confirm the amazing healing ability of PU (FIG. 18B). The tensile strength was well maintained at about 66% and the Young's modulus was slightly raised.

Figure 18C:
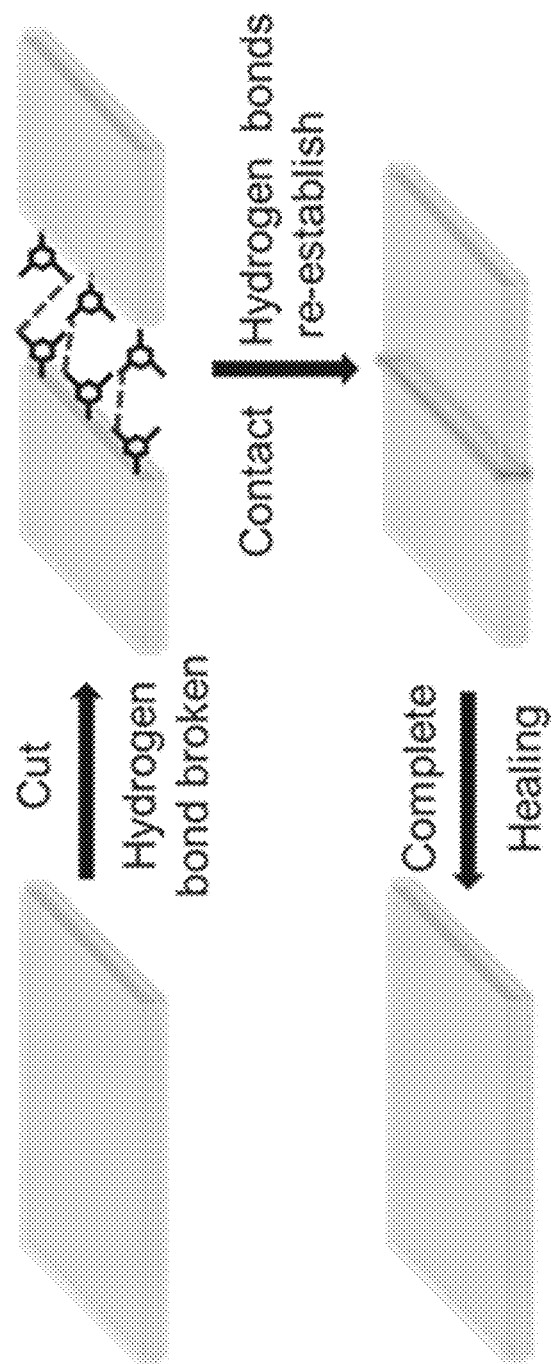
FIG. 18C is a schematic representation showing the self-healing mechanism of PU.

The self-healing property of the PU film is benefited from the reversible hydrogen bonds in PU. As schematically illustrated in FIG. 18C, once the PU film was cut into two parts, the strong intermolecular hydrogen bonds were broken. When the broken fragments were put in contact, the hydrogen bonding could re-establish as illustrated in FIG. 18C. Owing to its decent self-healing power, PU may be preferably used as a substrate for the battery system in this disclosure.

Figure 19A:
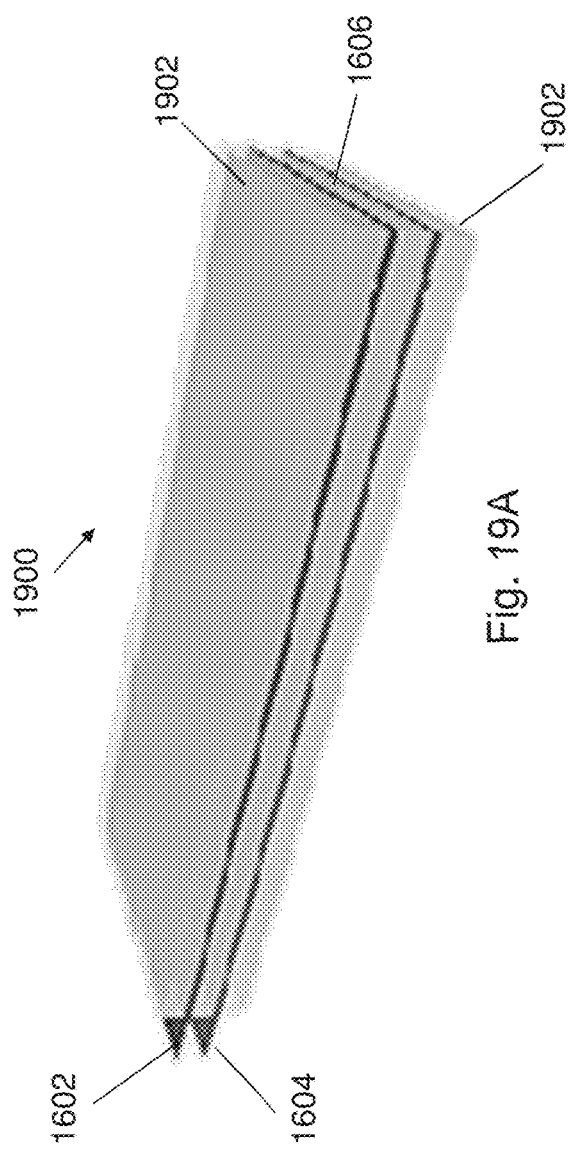
FIG. 19A is a schematic representation of a self-healable Zn—$MnO_2$ battery.
Figure 19B:
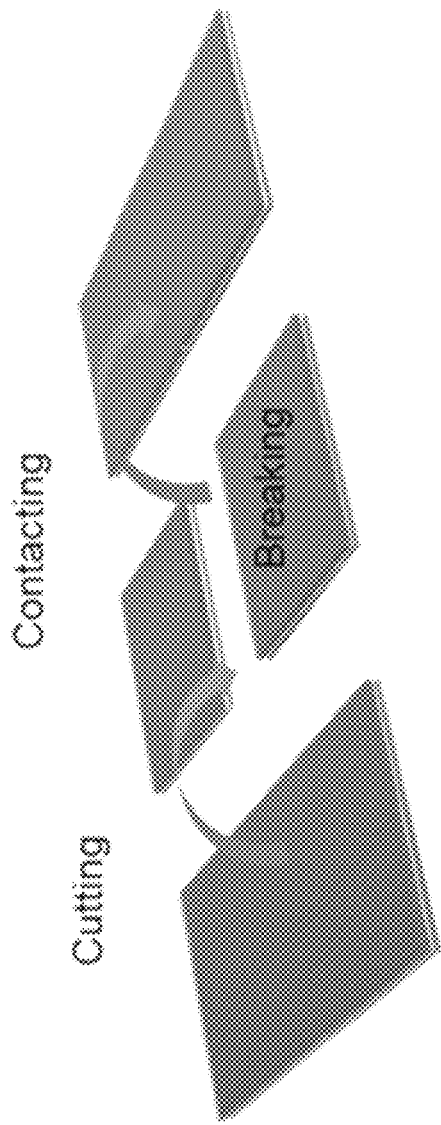
FIG. 19B is a schematic representation showing the self-healing mechanism of the self-healable Zn—$MnO_2$ battery of FIG. 19A.

For example, free-standing PU substrates 1902 may be disposed on the anode 1604 and the cathode 1602 of the battery 1600 to form a self-healable Zn—$MnO_2$ battery 1900 as illustrated in FIG. 19A. The battery 1900 may be self-healed by the process as illustrated in FIG. 19B. Briefly, when the fragments of battery 1900 were brought into contact with each other, the intermolecular hydrogen bonds of the PU substrates will be restored, thereby rejoining the fragments.

Figure 20:
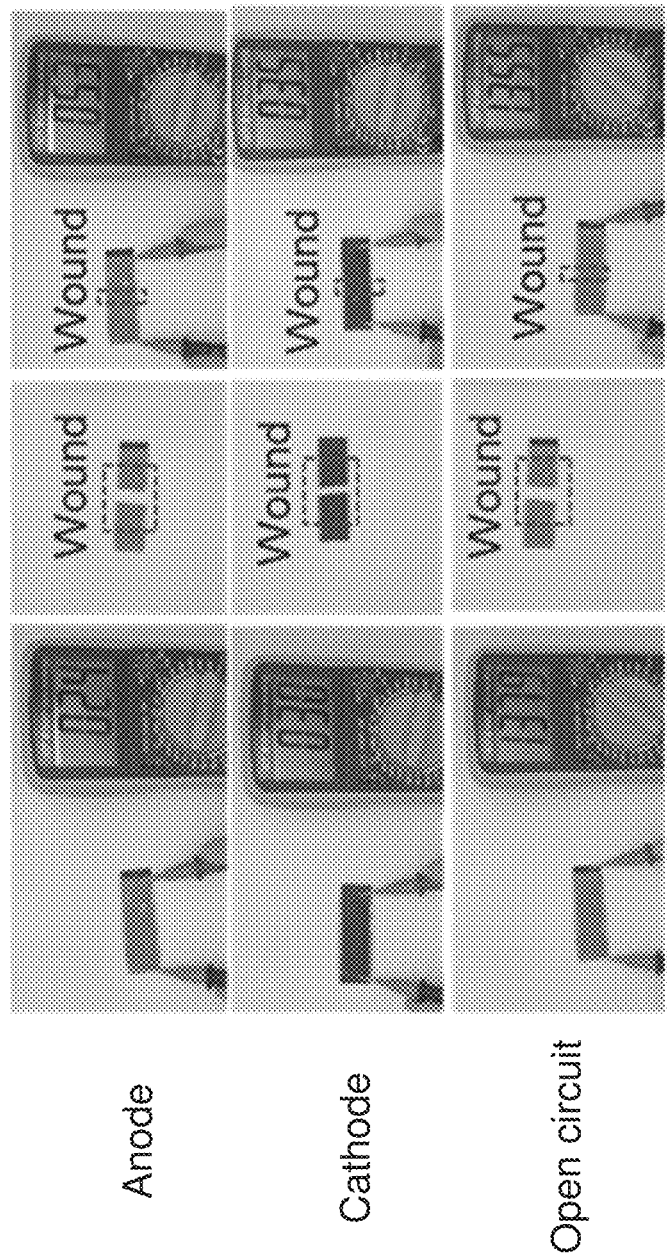
FIG. 20 is a series of optical images showing the electrical resistance of PU loaded anode and cathode, and open circuit voltage of the self-healable Zn—$MnO_2$ battery of FIG. 19A before subjecting to cutting and after healing. The unit of the resistance displayed on the multimeter is Ω., and the voltage is in the unit of V.

The healable ability of PU as a substrate was also measured in terms of the conductivity of anode, cathode and the open voltage of the total cell. As shown in FIG. 20, after subjecting to cutting and healing, the conductivity of anode and cathode was decreased slightly, and the open voltage of the whole cell was reduced from 1.379 V to 1.355 V. These data confirm the self-healing ability of PU as a substrate for Zn-NMOH battery.

Figure 21A:
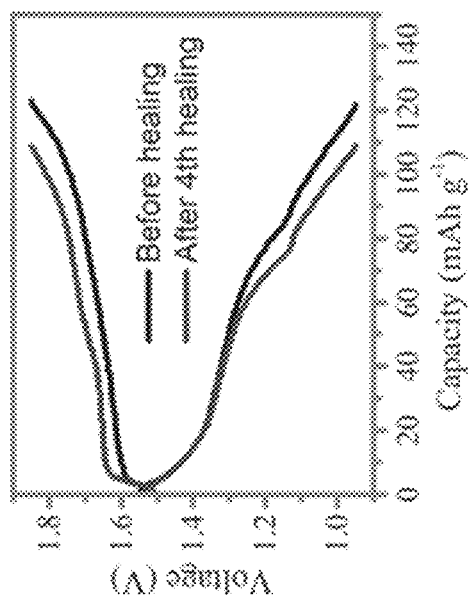
FIG. 21A is a plot of voltage against capacity showing the discharge-charge profiles of the self-healable Zn—$MnO_2$ battery of FIG. 19A at 10 C before and after the 4th healing process.
Figure 21B:
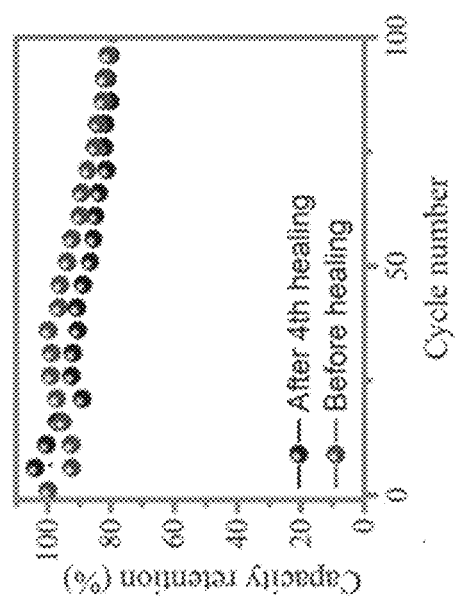
FIG. 21B is a plot of capacity retention against cycle number showing the cycling performance of the self-healable Zn—$MnO_2$ battery of FIG. 19A at 10 C before and after the 4th healing process.

The electrochemical performance of the self-healing battery 1900 was also tested. As shown in FIG. 21A, no significant change was observed in the discharge-charge curves after cutting and healing. The battery was still capable of delivering a voltage of ca. 1.4 V and a two-step discharge process at 10 C, with a small reduction in the discharge capacity from 122 mAh $g^{-1}$ to 108 mAh $g^{-1}$. The cycling stabilities before and after different cut/self-healing cycles were also tested and compared. As shown in FIG. 21B, after cutting and healing, a small decrease was observed in the first several cycles, and the capacity after healing was a little smaller than the origin flexible battery.

Figure 21D:
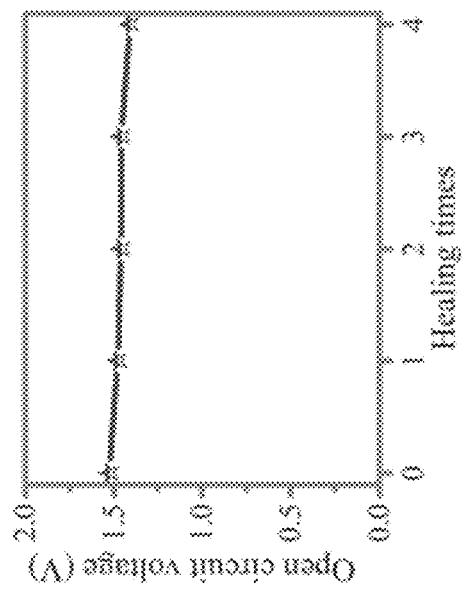
FIG. 21D is a plot of open circuit voltage against healing times of the self-healable Zn—$MnO_2$ battery of FIG. 19A.
Figure 21C:
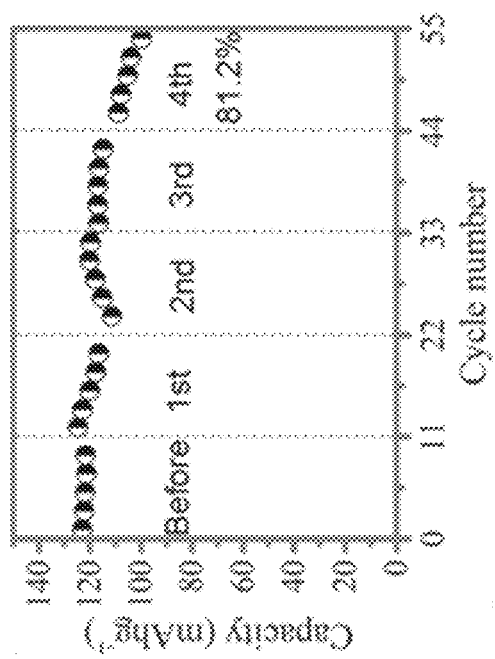
FIG. 21C is a plot of capacity against cycle number showing the capacity change of the self-healable Zn—$MnO_2$ battery of FIG. 19A against the number of healing times.
Figure 21E:
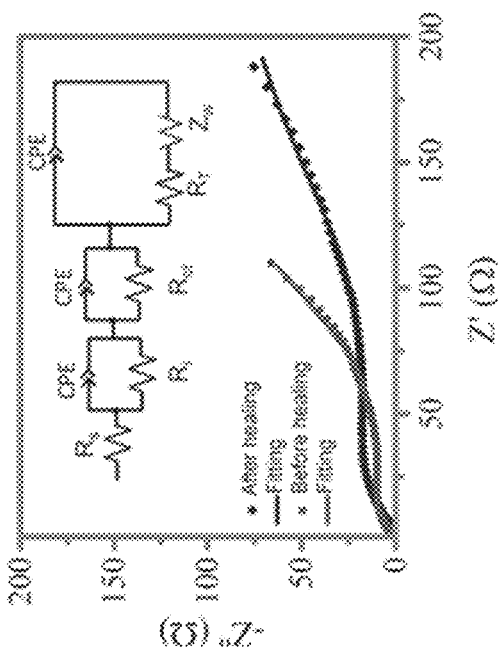
FIG. 21E is an EIS plot of the self-healable Zn—$MnO_2$ battery of FIG. 19A before and after healing. The insert corresponds to the circuit for fitting the EIS data. Impedances are measured in the frequency range from 100 kHz to 0.01 Hz.

The influence of healing times on the electrochemical performance was also evaluated, in terms of capacity (FIG. 21C), open circuit voltage (FIG. 21D), and impedance (FIG. 21E). As shown in FIG. 21C, whilst a reduction on the capacity was detected after the 4th cut/self-healing cycle, 81.2% of capacity retention was still obtained. The open circuit voltage exhibited a tiny drop from original 1.51 V to 1.48 V after 4 cut/self-healing cycles. The small degradation can be explained through the change of impedance, as shown in FIG. 21E, in which $R_s$ represents the series resistance of the cell; $R_i$ refers to the interface resistance between hydrogel electrolyte and electrode layer, $R_{ct}$ donates faradic charge-transfer resistance, which can be figured out by the semicircle at medium frequencies; the resistance ($R_T$) is relative to the phase change, and the diffusion process is in the form of Warburg impedance ($Z_w$). An increase in both interface resistance and charge transfer resistance was observed in the EIS plot, which may be caused by the uncompacted contact between the cut ends of the electrodes.

Figure 22:
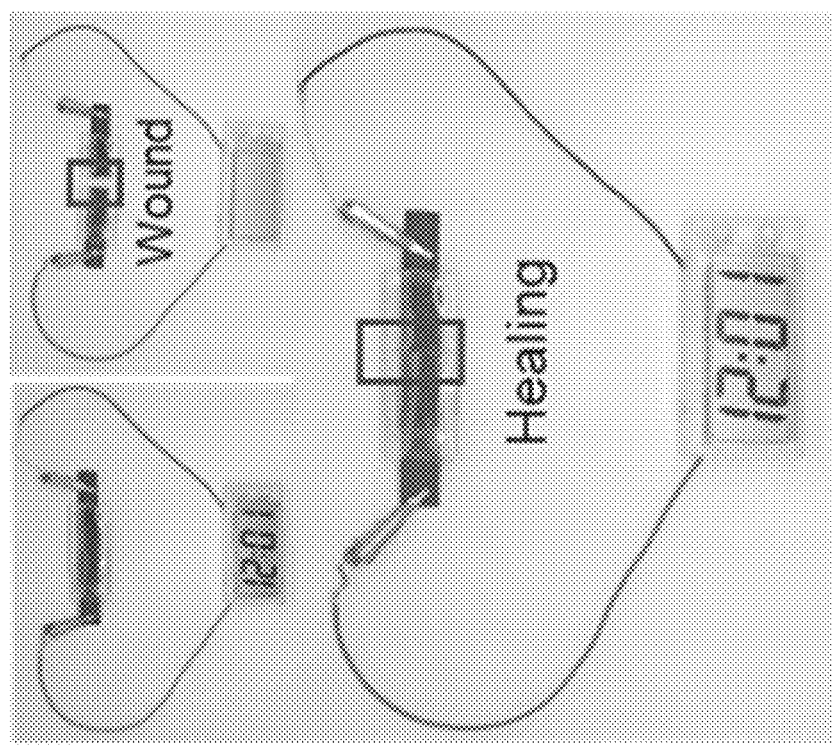
FIG. 22 is a series of optical images demonstrating the self-healable Zn—$MnO_2$ battery of FIG. 19A powering an electric watch before subjecting to cutting, after subjecting to cutting, and after healing.

The flexible self-healing Zn/NMOH battery 1900 was demonstrated to power a watch. As shown in FIG. 22, the battery is capable of powering an electric watch. When the battery was cut into two halves, the power supplied to the watch was gone. Upon bringing the two battery fragments in contact with each other, the battery underwent self-healing process and the power supplied to the electric watch is resumed. All these results confirm that the battery is able to power an electronic device after the self-healing process.

The energy storage device of the present invention such as the aforementioned Zn—MnO$_2$ battery is advantageous since it possesses excellent electrochemical properties. For example, the battery has a high capacity of 278 mAh g$^{-1}$ at 1 C to 20 C; and a stable discharge-charge cycling performance over 10000 cycles. The battery is also capable of being discharged and charged at 20 C within 1 min while maintaining a capacity of 106 mAh g$^{-1}$. All these features indicate the potential use of the battery in meeting the demanding charging and discharging requirements in multifunctional electronics and electric vehicles.

In addition, the battery of the present invention is capable of being self-healed, which is highly useful when the battery is accidentally broken during daily or long-term usage. This feature also increases the durability of the battery. Furthermore, the scaling up of the device is very cost effective and simple as it does not require a water-free and/or oxygen-free environment for assembling the battery.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electrode for an energy storage device, comprising:
    a plurality of layers of active material defining a layer material structure and wherein the plurality of layers of active materials are grouped together in a manner to form adjacent pairs of the plurality of layers of active materials; and
    an interlayer material disposed between each adjacent pair of the plurality of layers of active material;
    wherein the interlayer material is arranged to facilitate a transportation of ions along and/or across the plurality of layers of active material during a charging or a discharging operation of the energy storage device; and
    wherein the interlayer material includes at least one stabilizer intercalating between each of the pair of the plurality of layers of active material.

2. The electrode for an energy storage device according to claim 1, wherein the at least one stabilizer interacts with each of the adjacent pairs of the plurality of layers of active material so as to stabilize the layer material structure.

3. The electrode for an energy storage device according to claim 2, wherein the at least one stabilizer includes sodium ions and water molecules forming a physical interaction with each adjacent pairs of the plurality of layers of active material.

4. The electrode for an energy storage device according to claim 3, wherein the physical interaction includes van der Waals force that maintains integrity of the layer material structure during the charging or the discharging operation of the energy storage device.

5. The electrode for an energy storage device according to claim 4, wherein the layer material structure is further arranged to provide a plurality of interlayer channels for accommodating ions from an electrolyte, thereby minimizing a change in crystalline structure of each of the layers of active material upon performing an insertion and/or an extraction of the ions in the electrode that causes a change of volume in each of the plurality of layers of active material.

6. The electrode for an energy storage device according to claim 1, wherein the plurality of layers of active material includes a metal oxide.

7. The electrode for an energy storage device according to claim 6, wherein each of the layers of metal oxide includes a coordination compound of the metal oxide connecting with each other.

8. The electrode for an energy storage device according to claim 7, wherein each of the layers of metal oxide includes MnO$_6$ octahedron units with edges connecting with each other.

9. The electrode for an energy storage device according to claim 1, wherein the electrode further includes a substrate, wherein the active material is disposed on the substrate.

10. The electrode for an energy storage device according to claim 9, wherein the substrate includes a layer of polymeric material arranged to maintain integrity of the electrode.

11. The electrode for an energy storage device according to claim 10, wherein the polymeric material is arranged to at least partially recombine a plurality of fragments of the electrode.

12. The electrode for an energy storage device according to claim 11, wherein the polymeric material includes a polymer matrix having a plurality of intermolecular hydrogen bonds arranged to reform when the fragments of the electrode contact with each other.

13. The electrode for an energy storage device according to claim 10, wherein the polymeric material includes carboxylated polyurethane.

14. An energy storage device, comprising:
    a first electrode;
    a second electrode in accordance with claim 1; and
    an electrolyte including an aqueous electrolytic solution disposed between the electrodes.

15. The energy storage device according to claim 14, wherein the second electrode is a cathode including the plurality of layers of active material.

16. The energy storage device according to claim 14, wherein the first electrode is an anode including zinc.

17. The energy storage device according to claim 14, wherein the electrolyte includes a hydrogel electrolyte.

18. The energy storage device according to claim 17, wherein the electrolyte is a hydrogel of polyacrylamide.

19. The energy storage device according to claim 14, wherein the aqueous electrolytic solution includes $ZnSO_4$ and $MnSO_4$.

20. The energy storage device according to claim 14, wherein the energy storage device is a rechargeable battery.

* * * * *